(12) United States Patent
Higuchi et al.

(10) Patent No.: US 8,244,738 B2
(45) Date of Patent: Aug. 14, 2012

(54) DATA DISPLAY APPARATUS, METHOD, AND PROGRAM

(75) Inventors: Yasukazu Higuchi, Kawasaki (JP); Masahiro Sekine, Fuchu (JP); Isao Mihara, Tokyo (JP); Masayuki Okamoto, Kawasaki (JP); Daisuke Ajitomi, Kawasaki (JP); Yasunobu Yamauchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 349 days.

(21) Appl. No.: 12/585,269

(22) Filed: Sep. 10, 2009

(65) Prior Publication Data

US 2010/0250553 A1    Sep. 30, 2010

(30) Foreign Application Priority Data

Mar. 25, 2009   (JP) ................. P2009-075044

(51) Int. Cl.
*G06F 17/30* (2006.01)
(52) U.S. Cl. .................... 707/748; 707/723
(58) Field of Classification Search .............. 707/723, 707/748–749, 752, 913, 916
See application file for complete search history.

(56) References Cited

U.S. PATENT DOCUMENTS

| | | | |
|---|---|---|---|
| 6,263,501 B1 | 7/2001 | Schein et al. | |
| 6,389,424 B1 | 5/2002 | Kim et al. | |
| 6,466,193 B1 | 10/2002 | Anai | |
| 6,628,313 B1 | 9/2003 | Minakuchi et al. | |
| 6,646,980 B1 | 11/2003 | Yamamoto et al. | |
| 6,665,668 B1 | 12/2003 | Sugaya et al. | |
| 6,675,174 B1 | 1/2004 | Bolle et al. | |
| 6,745,205 B2 | 6/2004 | Choi et al. | |
| 6,756,972 B2 | 6/2004 | Komatsu et al. | |
| 6,853,374 B2 | 2/2005 | Iwasaki | |
| 6,853,389 B1 | 2/2005 | Ikeda | |
| 6,956,812 B2 | 10/2005 | Okada et al. | |
| 7,213,206 B2 | 5/2007 | Fogg | |
| 7,245,677 B1 | 7/2007 | Pare, Jr. | |
| 7,333,096 B2 | 2/2008 | Washio et al. | |

(Continued)

FOREIGN PATENT DOCUMENTS

EP    1 051 034    11/2000

(Continued)

OTHER PUBLICATIONS

Yoshiyuki Kokojima et al., "Resolution Independent Rendering of Deformable Vector Objects Using Graphics Hardware", Sketches, Siggraph, (2006).

(Continued)

*Primary Examiner* — Thu-Nguyet Le
(74) *Attorney, Agent, or Firm* — Nixon & Vanderhye, P.C.

(57) ABSTRACT

A display apparatus includes: a first memory to store a plurality of contents and pieces of content information including a plurality of elements; an element selector to select at least part of the plural elements correspond to a first content; a determine unit to determine whether or not the selected element matches the plural elements correspond to the contents; a generator to generate corresponding information for each of the contents based on a result of the determination; a second memory to store pieces of the corresponding information; a content selector to select a second content; a calculator to calculate degrees of association to the second content; a deciding unit to decide a arrangement positions of the plural contents except the second content according to the degrees of association calculated by the calculator; and a display unit to display the contents at the arrangement positions decided by the deciding unit.

7 Claims, 32 Drawing Sheets

U.S. PATENT DOCUMENTS

| | | | |
|---|---|---|---|
| 7,369,142 B2 | 5/2008 | Kondo et al. | |
| 7,421,455 B2 | 9/2008 | Hua et al. | |
| 7,519,121 B2 | 4/2009 | Matsushita et al. | |
| 7,519,685 B2 | 4/2009 | Nonaka et al. | |
| 7,557,865 B2 | 7/2009 | Minami et al. | |
| 7,590,948 B2 | 9/2009 | Narita et al. | |
| 7,805,022 B2 | 9/2010 | Tanaka | |
| 7,840,892 B2 | 11/2010 | Pyhalammi et al. | |
| 7,930,634 B2 | 4/2011 | Nakamura | |
| 7,940,285 B2 | 5/2011 | Would et al. | |
| 8,002,633 B2 | 8/2011 | Shimizu | |
| 2001/0007980 A1 | 7/2001 | Ishibashi et al. | |
| 2001/0035855 A1 | 11/2001 | Komatsu et al. | |
| 2002/0055924 A1 | 5/2002 | Liming | |
| 2002/0057294 A1 | 5/2002 | Ejima et al. | |
| 2002/0145603 A1 | 10/2002 | Iwasaki | |
| 2003/0103675 A1 | 6/2003 | Endo et al. | |
| 2003/0122773 A1 | 7/2003 | Washio et al. | |
| 2003/0142115 A1 | 7/2003 | Endo et al. | |
| 2004/0172410 A1* | 9/2004 | Shimojima et al. | 707/104.1 |
| 2005/0010599 A1 | 1/2005 | Kake et al. | |
| 2005/0055639 A1 | 3/2005 | Fogg | |
| 2005/0076361 A1 | 4/2005 | Choi et al. | |
| 2005/0097606 A1 | 5/2005 | Scott et al. | |
| 2005/0138564 A1 | 6/2005 | Fogg | |
| 2005/0210410 A1 | 9/2005 | Ohwa et al. | |
| 2005/0212726 A1 | 9/2005 | Namba et al. | |
| 2006/0086022 A1 | 4/2006 | Would et al. | |
| 2006/0150215 A1 | 7/2006 | Wroblewski | |
| 2007/0027855 A1 | 2/2007 | Kagawa | |
| 2007/0106661 A1 | 5/2007 | Narita et al. | |
| 2007/0106949 A1 | 5/2007 | Narita et al. | |
| 2007/0112940 A1 | 5/2007 | Morisawa et al. | |
| 2007/0130318 A1 | 6/2007 | Roast | |
| 2007/0252822 A1 | 11/2007 | Kim et al. | |
| 2008/0074985 A1 | 3/2008 | Mukaiyama et al. | |
| 2008/0136837 A1 | 6/2008 | Iguchi | |
| 2008/0215548 A1 | 9/2008 | Ohashi et al. | |
| 2008/0235729 A1 | 9/2008 | Doi et al. | |
| 2008/0267582 A1 | 10/2008 | Yamauchi et al. | |
| 2008/0316229 A1 | 12/2008 | Terayoko | |
| 2008/0316518 A1 | 12/2008 | Watari et al. | |
| 2009/0019031 A1 | 1/2009 | Krovitz et al. | |
| 2009/0025030 A1 | 1/2009 | Kasutani | |
| 2009/0080698 A1 | 3/2009 | Mihara et al. | |
| 2009/0083814 A1 | 3/2009 | Sekine et al. | |
| 2009/0228800 A1 | 9/2009 | Yasuda | |
| 2009/0262139 A1 | 10/2009 | Tanaka et al. | |
| 2010/0054703 A1 | 3/2010 | Tanaka et al. | |
| 2010/0057696 A1 | 3/2010 | Miyazawa et al. | |
| 2010/0057722 A1 | 3/2010 | Nakamura et al. | |
| 2010/0058173 A1 | 3/2010 | Kizuka et al. | |
| 2010/0058213 A1 | 3/2010 | Higuchi et al. | |
| 2010/0058388 A1 | 3/2010 | Baba et al. | |
| 2010/0156893 A1 | 6/2010 | Mihara et al. | |
| 2010/0302595 A1 | 12/2010 | Yamada et al. | |
| 2010/0333140 A1 | 12/2010 | Onodera et al. | |

FOREIGN PATENT DOCUMENTS

| | | |
|---|---|---|
| EP | 1 513 341 | 9/2005 |
| EP | 1 785 814 | 5/2007 |
| EP | 2 159 713 | 3/2010 |
| EP | 2 159 722 | 3/2010 |
| EP | 2 160 032 | 3/2010 |
| EP | 2 166 752 | 3/2010 |
| JP | 09-219835 | 8/1997 |
| JP | 09-259130 | 10/1997 |
| JP | 11-003346 | 1/1999 |
| JP | 11-175534 | 7/1999 |
| JP | 11-249774 | 9/1999 |
| JP | 2000-076267 | 3/2000 |
| JP | 2000-242648 | 9/2000 |
| JP | 2000-305946 | 11/2000 |
| JP | 2001-175380 | 6/2001 |
| JP | 2001-186497 | 7/2001 |
| JP | 2001-292383 | 10/2001 |
| JP | 2001-326881 | 11/2001 |
| JP | 2002-175269 | 6/2002 |
| JP | 2002-175321 | 6/2002 |
| JP | 2002-209178 | 7/2002 |
| JP | 2003-167914 | 6/2003 |
| JP | 2003-330969 | 11/2003 |
| JP | 2004-178085 | 6/2004 |
| JP | 2004-178384 | 6/2004 |
| JP | 2004-258390 | 9/2004 |
| JP | 2005-010854 | 1/2005 |
| JP | 2005-267390 | 9/2005 |
| JP | 2006-094520 | 4/2006 |
| JP | 2006-260178 | 9/2006 |
| JP | 2007-034663 | 2/2007 |
| JP | 2007-066285 | 3/2007 |
| JP | 2007-122496 | 5/2007 |
| JP | 2007-148669 | 6/2007 |
| JP | 2007-149313 | 6/2007 |
| JP | 2007-249641 | 9/2007 |
| JP | 2007-272651 | 10/2007 |
| JP | 2008-077774 | 4/2008 |
| JP | 2008-078785 | 4/2008 |
| JP | 2008-129942 | 6/2008 |
| JP | 2008-130032 | 6/2008 |
| JP | 2008-134725 | 6/2008 |
| JP | 2008-242504 | 10/2008 |
| JP | 2009-080580 | 4/2009 |
| WO | 00/33572 | 6/2000 |
| WO | 2004/091216 | 10/2004 |

OTHER PUBLICATIONS

Masaru Suzuki et al., "Sasatto Search" Human Interface Technology for Information Retrieval, Toshiba Review vol. 62, No. 12, 2007, pp. 54-57.
U.S. Appl. No. 12/232,186.
Sekine et al., U.S. Appl. No. 12/232,186, filed Sep. 11, 2008.
Tanaka et al., U.S. Appl. No. 12/416,786, filed Apr. 1, 2009.
Kizuka et al., U.S. Appl. No. 12/418,474, filed Apr. 3, 2009.
Baba et al., U.S. Appl. No. 12/426,756, filed Apr. 20, 2009.
Miyazawa et al., U.S. Appl. No. 12/431,663, filed Apr. 28, 2009.
Nakamura et al., U.S. Appl. No. 12/461,761, filed Aug. 24, 2009.
Higuchi et al., U.S. Appl. No. 12/461,924, filed Aug. 27, 2009.
Mihara et al., U.S. Appl. No. 12/585,458, filed Sep. 15, 2009.
Loviscach, "Motion Blur for Textures by Means of Anisotropic Filtering," Eurographics Symposium on Rendering (2005), pp. 105-110.
Takeuchi et al., "Motion sharpening in moving natural images," Journal of Vision (2002), 2:377 (Abstract).
Brostow et al., "Image-Based Motion Blur for Stop Motion Animation", Proc. of Siggraph '01, pp. 561-566, (2001).
Ramos, et al., "Fluid Interaction Techniques for the Control and Annotation of Digital Video", Proceedings of the 16th annual ACM Symposium on User Interface Software and Technology, vol. 5, Issue 2, pp. 105-114, (2003).
Irani et al., "Efficient Representations of Video Sequence and Their Applications", Signal processing Image Communication (Journal), pp. 1-39, (1996).
Teodosio et al., "Salient Stills", ACM Transaction on Multimedia Computing, Communications and Appllications, pp. 16-36, (2005).
Agarwala et al., "Interactive Digital Photomontage", ACM Siggraph, pp. 1-9, (2004).
Huan-Bo Luan et al., Interactive Spatio-Temporal Visual Map Model Web Video Retrieval, Multimedia and Expo, 2007, IEEE International Conference on, IEEE, P1, Jul. 1, 2007, pp. 560-563, ISBN: 978-1-4244-1016-3. (Abstract).
Yamauchi et al., U.S. Appl. No. 12/049,455, filed Mar. 17, 2008.
Mihara et al., U.S. Appl. No. 12/076,439, filed Mar. 18, 2008.

* cited by examiner

FIG. 2

| ITEM | VALUE |
|---|---|
| CONTENT ID | 1 |
| TITLE | [CAPTIONED] TREASURE!! ANCIENT HERITAGE Top100 "HOMER IMMORTAL METROPOLIS" |
| CATEGORY | DOCUMENTARY/CULTURE (HISTORY/TRAVEL) |
| START TIME | 2029/7/21  22:45 |
| END TIME | 2029/7/21  23:00 |
| OUTLINE | ▽ILIOS CHASTLE/ISLANDS OF ITHAKA/ SCAMANDER AND DELTA/ASIAN-STYLE ARCHITECTURE IN TROY [COMMENTATOR] NAONORI ICHO (HISTORIAN, AUTHOR) [NARRATOR] YURIKO KORETO [THEME MUSIC] YUZURU NAGAIWA |
| DETAILS | CONTENT OF PROGRAM ESTIMATEDLY 3000 YEARS HAS PASSED AFTER HIS DEATH. HOMER IS A POET WHOSE LYRICS ARE STILL PUBLISHED IN VARIOUS PLACES OF THE WORLD. MANY OF THE STAGES OF HIS WORKS STILL REMAIN AS ANCIENT RUINS. PERSONAGES OF THE STORIES ARE INTRODUCED AND THE ANCIENT RUINS AS THEIR STAGES ARE VISITED. APPEARING IN THE PROGRAM ARE ILIOS CASTLE IN TURKEY, ITHAKA IN GREECE, SCAMANDER RIVER AND ITS DELTA IN TURKEY, AND ASIAN-STYLE ARCHITECTURE IN TROY. THE COMMENTATOR IS MR. NAONORI ICHO, HISTORIAN AND AUTHOR. CAST [COMMENTATOR] NAONORI ICHO, HISTORIAN/ AUTHOR, [NARRATOR] YURIKO KORETO, MUSIC [THEME MUSIC] YUZURU NAGAIWA |

FIG. 4C

| ARRANGEMENT SLOT ID | POSITIONAL COORDINATES | | | CONTENT ALLOCATION SEQUENCE | ALLOCATED CONTENT ID |
|---|---|---|---|---|---|
| | x | y | z | | |
| 1 | 1.00 | 0.00 | 5.00 | 1 | 201 |
| 2 | 0.00 | 1.00 | 5.00 | 2 | 7 |
| 3 | -1.00 | 0.00 | 5.00 | 3 | — |
| 4 | 0.00 | -1.00 | 5.00 | 4 | — |
| 5 | 2.00 | 0.00 | 3.00 | 5 | — |
| ⋮ | | | | | |

FIG. 5

| CHARACTERISTIC ELEMENT | TYPE | VALUE (CHARACTERISTIC INFORMATION) |
|---|---|---|
| CONTENT ID | | 1 |
| TITLE CHARACTERISTIC | MAIN | TREASURE!! ANCIENT HERITAGE Top 100 |
| | SUB | HOMER IMMORTAL METROPOLIS |
| CATEGORY CHARACTERISTIC | MAIN | DOCUMENTARY/CULTURE |
| | SUB | HISTORY/TRAVEL |
| KEYWORD CHARACTERISTIC | NOUN(GENERAL) | ANCIENT RUINS |
| | NOUN(PROPER) | ILIOS CASTLE |
| | NOUN (PLACE NAME) | ITHAKA |
| | NOUN (PLACE NAME) | SCAMANDER RIVER |
| | NOUN (PLACE NAME) | TROY |
| | NOUN (GENERAL) | ASIAN-STYLE ARCHITECTURE |
| | NOUN (PLACE NAME) | TURKEY |
| | NOUN (PLACE NAME) | GREECE |
| | NOUN (GENERAL) | LYRICS |
| FIGURE CHARACTERISTIC | CAST | NAONORI ICHO |
| | NARRATOR | YURIKO KORETO |
| | MUSIC | YUZURU NAGAIWA |
| | OTHERS | HOMER |

FIG. 6

| CHARACTERISTIC ELEMENT | WEIGHTING FACTOR |
|---|---|
| TITLE CHARACTERISTIC | 0.5 |
| CATEGORY CHARACTERISTIC | 0.25 |
| FIGURE CHARACTERISTIC | 0.15 |
| KEYWORD CHARACTERISTIC | 0.1 |

FIG. 7

| CHARACTERISTIC ELEMENT | TYPE | RATIO |
|---|---|---|
| TITLE CHARACTERISTIC | MAIN | 1 |
| | SUB | 1.5 |
| CATEGORY CHARACTERISTIC | MAIN | 1 |
| | SUB | 1.2 |
| FIGURE CHARACTERISTIC | CAST | 1.2 |
| | NARRATOR | 1 |
| | MUSIC | 1 |
| | OTHERS | 0.8 |
| KEYWORD CHARACTERISTIC | NOUN (GENERAL) | 0.8 |
| | NOUN (GENERAL) | 1.2 |
| | NOUN (PLACE NAME) | 1.2 |

FIG. 8

| CONTENT ID | 1 | | | |
|---|---|---|---|---|
| ARRANGEMENT CONDITION ID | SEARCH CONDITION | MINIMUM DEGREE OF ASSOCIATION | NUMBER | TOTAL NUMBER |
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 3 |
| 2 | AND(TREASURE!! ANCIENT HERITAGE Top 100, DOCUMENTARY/CULTURE, HISTORY/TRAVEL, YURIKO KORETO, YUZURU NAGAIWA, NAONORI ICHO, OR(ANCIENT RUINS, GREECE, TURKEY, ASIAN-STYLE ARCHITECTURE, LYRICS)) | 0.578 | 2 | 5 |
| 3 | AND(DOCUMENTARY/CULTURE, HISTORY/TRAVEL, OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.296 | 0 | 5 |
| 4 | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE LYRICS)) | 0.159 | 0 | 5 |
| 5 | AND(OR(DOCUMENTARY/CULTURE, HISTORY/TRAVEL), OR(YURIKO KORETO, YUZURU NAGAIWA, NAONORI ICHO)) | 0.151 | 3 | 8 |
| 6 | AND(OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.122 | 10 | 18 |
| 7 | OR(YURIKO KORETO, YUZURU NAGAIWA, NAONORI ICHO) | 0.046 | 2 | 20 |
| 8 | OR(ANCIENT RUINS, GREECE, TURKEY, ASIAN-STYLE ARCHITECTURE, LYRICS) | 0.038 | 7 | 27 |
| 9 | AND(DOCUMENTARY/CULTURE, HISTORY/TRAVEL) | 0.008 | 5 | 32 |
| | | 0.250 | 12 | 44 |
| | DOCUMENTARY/CULTURE | 0.114 | 170 | 214 |

FIG. 10

| CONTENT ID | | | 1 | |
|---|---|---|---|---|
| VALUE (CHARACTERISTIC INFORMATION) | CHARACTERISTIC ELEMENT | | NUMBER | DEGREE OF ASSOCIATION |
| | TYPE | SUB TYPE | | |
| TREASURE!! ANCIENT HERITAGE Top 100 | TITLE | MAIN | 5 | 0.200 |
| HOMER IMMORTAL METROPOLIS | TITLE | SUB | 3 | 0.300 |
| DOCUMENTARY/CULTURE | CATEGORY | MAIN | 200 | 0.114 |
| HISTORY/TRAVEL | CATEGORY | SUB | 30 | 0.136 |
| ANCIENT RUINS | KEYWORD | NOUN (GENERAL) | 15 | 0.008 |
| ILIOS CASTLE | KEYWORD | NOUN (PROPER) | 3 | 0.013 |
| ITHAKA | KEYWORD | NOUN (PLACE NAME) | 3 | 0.013 |
| SCAMANDER RIVER | KEYWORD | NOUN (PLACE NAME) | 3 | 0.013 |
| TROY | KEYWORD | NOUN (PLACE NAME) | 3 | 0.013 |
| ASIAN-STYLE ARCHITECTURE | KEYWORD | NOUN (GENERAL) | 5 | 0.008 |
| TURKEY | KEYWORD | NOUN (PLACE NAME) | 7 | 0.013 |
| GREECE | KEYWORD | NOUN (PLACE NAME) | 10 | 0.013 |
| LYRICS | KEYWORD | NOUN (GENERAL) | 5 | 0.008 |
| NAONORI ICHO | FIGURE | CAST | 6 | 0.045 |
| YURIKO KORETO | FIGURE | NARRATOR | 9 | 0.038 |
| YUZURU NAGAIWA | FIGURE | MUSIC | 7 | 0.038 |
| HOMER | FIGURE | OTHERS | 3 | 0.030 |

FIG. 11A

| ARRANGEMENT CONDITION ID | SEARCH CONDITION | MINIMUM DEGREE OF ASSOCIATION | NUMBER | TOTAL NUMBER |
|---|---|---|---|---|
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 3 |

FIG. 11B

| CHARACTERISTIC INFORMATION | CHARACTERISTIC ELEMENT | | NUMBER | DEGREE OF ASSOCIATION |
|---|---|---|---|---|
| | TYPE | SUB TYPE | | |
| TREASURE!! ANCIENT HERITAGE Top 100 | TITLE | MAIN | 2 | 0.200 |
| HOMER IMMORTAL METROPOLIS | TITLE | SUB | 0 | 0.300 |
| DOCUMENTARY/CULTURE | CATEGORY | MAIN | 197 | 0.114 |
| HISTORY/TRAVEL | CATEGORY | SUB | 27 | 0.136 |
| YURIKO KORETO | FIGURE | NARRATOR | 6 | 0.038 |
| YUZURU NAGAIWA | FIGURE | MUSIC | 4 | 0.038 |
| NONORI ICHO | FIGURE | CAST | 3 | 0.045 |
| HOMER | FIGURE | OTHERS | 0 | 0.030 |
| ANCIENT RUINS | KEYWORD | NOUN (GENERAL) | 12 | 0.008 |
| GREECE | KEYWORD | NOUN (PLACE NAME) | 7 | 0.013 |
| TURKEY | KEYWORD | NOUN (PLACE NAME) | 4 | 0.013 |
| ASIAN-STYLE ARCHITECTURE | KEYWORD | NOUN (GENERAL) | 2 | 0.008 |
| LYRICS | KEYWORD | NOUN (GENERAL) | 2 | 0.008 |
| ILIOS CASTLE | KEYWORD | NOUN (PROPER) | 0 | 0.013 |
| ITHAKA | KEYWORD | NOUN (PLACE NAME) | 0 | 0.013 |
| SCAMANDER RIVER | KEYWORD | NOUN (PLACE NAME) | 0 | 0.013 |
| TROY | KEYWORD | NOUN (PLACE NAME) | 0 | 0.013 |

FIG. 11C

| ARRANGEMENT CONDITION ID | SEARCH CONDITION | MINIMUM DEGREE OF ASSOCIATION | NUMBER | TOTAL NUMBER |
|---|---|---|---|---|
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 3 |
| 2 | AND(TREASURE!! ANCIENT HERITAGE Top 100, DOCUMENTARY/CULTURE, HISTORY/TRAVEL, YURIKO KORETO, YUZURU NAGAIWA, NAONORI ICHO, OR(ANCIENT RUINS, GREECE, TURKEY, ASIAN-STYLE ARCHITECTURE, LYRICS)) | 0.578 | 2 | 5 |

FIG. 11D

| CHARACTERISTIC INFORMATION | CHARACTERISTIC ELEMENT | | NUMBER | DEGREE OF ASSOCIATION |
|---|---|---|---|---|
| | TYPE | SUB TYPE | | |
| TREASURE!! ANCIENT HERITAGE Top 100 | TITLE | MAIN | 0 | 0.200 |
| HOMER: IMMORTAL METROPOLIS | TITLE | SUB | 0 | 0.300 |
| DOCUMENTARY/CULTURE | CATEGORY | MAIN | 195 | 0.114 |
| HISTORY/TRAVEL | CATEGORY | SUB | 25 | 0.136 |
| YURIKO KORETO | FIGURE | NARRATOR | 4 | 0.038 |
| YUZURU NAGAIWA | FIGURE | MUSIC | 2 | 0.038 |
| NONORI ICHO | FIGURE | CAST | 1 | 0.045 |
| HOMER | FIGURE | OTHERS | 0 | 0.030 |
| ANCIENT RUINS | KEYWORD | NOUN (GENERAL) | | 0.008 |
| GREECE | KEYWORD | NOUN (PLACE NAME) | 17(OR) | 0.013 |
| TURKEY | KEYWORD | NOUN (PLACE NAME) | | 0.013 |
| ASIAN-STYLE ARCHITECTURE | KEYWORD | NOUN (GENERAL) | | 0.008 |
| LYRICS | KEYWORD | NOUN (GENERAL) | | 0.008 |
| ILIOS CASTLE | KEYWORD | NOUN (PROPER) | 0 | 0.013 |
| THAKA | KEYWORD | NOUN (PLACE NAME) | 0 | 0.013 |
| SCAMANDER RIVER | KEYWORD | NOUN (PLACE NAME) | 0 | 0.013 |
| TROY | KEYWORD | NOUN (PLACE NAME) | 0 | 0.013 |

FIG. 11E

| ARRANGEMENT CONDITION ID | SEARCH CONDITION | MINIMUM DEGREE OF ASSOCIATION | NUMBER | TOTAL NUMBER |
|---|---|---|---|---|
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 3 |
| 2 | AND(TREASURE!! ANCIENT HERITAGE Top 100, DOCUMENTARY/CULTURE, HISTORY/TRAVEL, YURIKO KORETO, YUZURU NAGAIWA, NAONORI ICHO, OR(ANCIENT RUINS, GREECE, TURKEY, ASIAN-STYLE ARCHITECTURE, LYRICS)) | 0.578 | 2 | 5 |
| | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.296 | 0 | 5 |
| | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.159 | 0 | 5 |
| 3 | AND(OR(DOCUMENTARY/CULTURE, HISTORY/TRAVEL), OR(YURIKO KORETO, YUZURU NAGAIWA, NAONORI ICHO)) | 0.151 | 3 | 8 |

FIG. 11F

| CHARACTERISTIC INFORMATION | CHARACTERISTIC ELEMENT | | NUMBER | DEGREE OF ASSOCIATION |
|---|---|---|---|---|
| | TYPE | SUB TYPE | | |
| TREASURE!! ANCIENT HERITAGE Top 100 | TITLE | MAIN | | 0.200 |
| HOMER IMMORTAL METROPOLIS | TITLE | SUB | | 0.300 |
| DOCUMENTARY/CULTURE | CATEGORY | MAIN | 192(OR) | 0.114 |
| HISTORY/TRAVEL | CATEGORY | SUB | | 0.136 |
| YURIKO KORETO | FIGURE | NARRATOR | | 0.038 |
| YUZURU NAGAIWA | FIGURE | MUSIC | 9(OR) | 0.038 |
| NONORI ICHO | FIGURE | CAST | | 0.045 |
| HOMER | FIGURE | OTHERS | | 0.030 |
| ANCIENT RUINS | KEYWORD | NOUN (GENERAL) | | 0.008 |
| GREECE | KEYWORD | NOUN (PLACE NAME) | | 0.013 |
| TURKEY | KEYWORD | NOUN (PLACE NAME) | 17(OR) | 0.013 |
| ASIAN-STYLE ARCHITECTURE | KEYWORD | NOUN (GENERAL) | | 0.008 |
| LYRICS | KEYWORD | NOUN (GENERAL) | | 0.008 |
| ILIOS CASTLE | KEYWORD | NOUN (PROPER) | | 0.013 |
| ITHAKA | KEYWORD | NOUN (PLACE NAME) | | 0.013 |
| SCAMANDER RIVER | KEYWORD | NOUN (PLACE NAME) | | 0.013 |
| TROY | KEYWORD | NOUN (PLACE NAME) | | 0.013 |

FIG. 11G

| ARRANGEMENT CONDITION ID | SEARCH CONDITION | MINIMUM DEGREE OF ASSOCIATION | NUMBER | TOTAL NUMBER |
|---|---|---|---|---|
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 3 |
| 2 | AND(TREASURE!! ANCIENT HERITAGE Top 100, DOCUMENTARY/CULTURE, HISTORY/TRAVEL, YURIKO KORETO, YUZURU NAGAIWA, NAONORI ICHO, OR(ANCIENT RUINS, GREECE, TURKEY, ASIAN-STYLE ARCHITECTURE, LYRICS)) | 0.578 | 2 | 5 |
|  | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.296 | 0 | 5 |
|  | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.159 | 0 | 5 |
| 3 | AND(OR(DOCUMENTARY/CULTURE, HISTORY/TRAVEL), OR(YURIKO KORETO, YUZURU NAGAIWA, NAONORI ICHO)) | 0.151 | 3 | 8 |
| 4 | AND(OR(DOCUMENTARY/CULTURE, HISTORY/TRAVEL), OR(ANCIENT RUINS, GREECE, TURKEY, ASIAN-STYLE ARCHITECTURE, LYRICS)) | 0.122 | 10 | 18 |

FIG. 11H

| CHARACTERISTIC INFORMATION | CHARACTERISTIC ELEMENT | | NUMBER | DEGREE OF ASSOCIATION |
|---|---|---|---|---|
| | TYPE | SUB TYPE | | |
| TREASURE!! ANCIENT HERITAGE Top 100 | TITLE | MAIN | 0 | 0.200 |
| HOMER IMMORTAL METROPOLIS | TITLE | SUB | 0 | 0.300 |
| DOCUMENTARY/CULTURE | CATEGORY | MAIN | | 0.114 |
| HISTORY/TRAVEL | CATEGORY | SUB | | 0.136 |
| YURIKO KORETO | FIGURE | NARRATOR | 182(OR) | 0.038 |
| YUZURU NAGAIWA | FIGURE | MUSIC | | 0.038 |
| NONORINCHO | FIGURE | CAST | 9(OR) | 0.045 |
| HOMER | FIGURE | OTHERS | | 0.030 |
| ANCIENT RUINS | KEYWORD | NOUN (GENERAL) | 0 | 0.008 |
| GREECE | KEYWORD | NOUN (PLACE NAME) | | 0.013 |
| TURKEY | KEYWORD | NOUN (PLACE NAME) | 7(OR) | 0.013 |
| ASIAN-STYLE ARCHITECTURE | KEYWORD | NOUN (GENERAL) | | 0.008 |
| LYRICS | KEYWORD | NOUN (GENERAL) | | 0.008 |
| ILIOS CASTLE | KEYWORD | NOUN (PROPER) | 0 | 0.013 |
| ITHAKA | KEYWORD | NOUN (PLACE NAME) | 0 | 0.013 |
| SCAMANDER RIVER | KEYWORD | NOUN (PLACE NAME) | 0 | 0.013 |
| TROY | KEYWORD | NOUN (PLACE NAME) | 0 | 0.013 |

FIG. 11I

| ARRANGEMENT CONDITION ID | SEARCH CONDITION | MINIMUM DEGREE OF ASSOCIATION | NUMBER | TOTAL NUMBER |
|---|---|---|---|---|
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 3 |
| 2 | AND(TREASURE!! ANCIENT HERITAGE Top 100, DOCUMENTARY/CULTURE, HISTORY/TRAVEL, YURIKO KORETO, YUZURU NAGAIWA, NAONORI ICHO, OR(ANCIENT RUINS, GREECE, TURKEY, ASIAN-STYLE ARCHITECTURE, LYRICS)) | 0.578 | 2 | 5 |
| | AND(DOCUMENTARY/CULTURE, HISTORY/TRAVEL, OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.296 | 0 | 5 |
| | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.159 | 0 | 5 |
| 3 | AND(OR(DOCUMENTARY/CULTURE, HISTORY/TRAVEL), OR(YURIKO KORETO, YUZURU NAGAIWA, NAONORI ICHO)) | 0.151 | 3 | 8 |
| 4 | AND(OR(DOCUMENTARY/CULTURE, HISTORY/TRAVEL), OR(ANCIENT RUINS, GREECE, TURKEY, ASIAN-STYLE ARCHITECTURE, LYRICS)) | 0.122 | 10 | 18 |
| 5 | AND(OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.046 | 2 | 20 |

FIG. 11J

| CHARACTERISTIC INFORMATION | CHARACTERISTIC ELEMENT | | NUMBER | DEGREE OF ASSOCIATION |
|---|---|---|---|---|
| | TYPE | SUB TYPE | | |
| TREASURE!! ANCIENT HERITAGE Top 100 | TITLE | MAIN | 0 | 0.200 |
| HOMER IMMORTAL METROPOLIS | TITLE | SUB | 0 | 0.300 |
| DOCUMENTARY/CULTURE | CATEGORY | MAIN | | 0.114 |
| HISTORY/TRAVEL | CATEGORY | SUB | 182(OR) | 0.136 |
| YURIKO KORETO | FIGURE | NARRATOR | | 0.038 |
| YUZURU NAGAIWA | FIGURE | MUSIC | 7(OR) | 0.038 |
| NONORI ICHO | FIGURE | CAST | | 0.045 |
| HOMER | FIGURE | OTHERS | | 0.030 |
| ANCIENT RUINS | KEYWORD | NOUN (GENERAL) | | 0.008 |
| GREECE | KEYWORD | NOUN (PLACE NAME) | 5(OR) | 0.013 |
| TURKEY | KEYWORD | NOUN (PLACE NAME) | | 0.013 |
| ASIAN-STYLE ARCHITECTURE | KEYWORD | NOUN (GENERAL) | | 0.008 |
| LYRICS | KEYWORD | NOUN (GENERAL) | | 0.008 |
| ILIOS CASTLE | KEYWORD | NOUN (PROPER) | 0 | 0.013 |
| ITHAKA | KEYWORD | NOUN (PLACE NAME) | 0 | 0.013 |
| SCAMANDER RIVER | KEYWORD | NOUN (PLACE NAME) | 0 | 0.013 |
| TROY | KEYWORD | NOUN (PLACE NAME) | 0 | 0.013 |

FIG. 11K

| ARRANGEMENT CONDITION ID | SEARCH CONDITION | MINIMUM DEGREE OF ASSOCIATION | NUMBER | TOTAL NUMBER |
|---|---|---|---|---|
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 3 |
| 2 | AND(TREASURE!! ANCIENT HERITAGE Top 100, DOCUMENTARY/CULTURE, HISTORY/TRAVEL, YURIKO KORETO, YUZURU NAGAIWA, NAONORI ICHO, OR(ANCIENT RUINS, GREECE, TURKEY, ASIAN-STYLE ARCHITECTURE, LYRICS)) | 0.578 | 2 | 5 |
| | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.296 | 0 | 5 |
| | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.159 | 0 | 5 |
| 3 | AND(OR(DOCUMENTARY/CULTURE, HISTORY/TRAVEL), OR(YURIKO KORETO, YUZURU NAGAIWA, NAONORI ICHO)) | 0.151 | 3 | 8 |
| 4 | AND(OR(DOCUMENTARY/CULTURE, HISTORY/TRAVEL), OR(ANCIENT RUINS, GREECE, TURKEY, ASIAN-STYLE ARCHITECTURE, LYRICS)) | 0.122 | 10 | 18 |
| 5 | AND(OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.046 | 2 | 20 |
| 6 | OR(YURIKO KORETO, YUZURU NAGAIWA, NAONORI ICHO) | 0.038 | 7 | 27 |

FIG. 11L

| CHARACTERISTIC INFORMATION | CHARACTERISTIC ELEMENT | | NUMBER | DEGREE OF ASSOCIATION |
|---|---|---|---|---|
| | TYPE | SUB TYPE | | |
| HOMER IMMORTAL METROPOLIS | TITLE | MAIN | 0 | 0.200 |
| | TITLE | SUB | 0 | 0.300 |
| DOCUMENTARY/CULTURE | CATEGORY | MAIN | 182(OR) | 0.114 |
| HISTORY/TRAVEL | CATEGORY | SUB | | 0.136 |
| YURIKO KORETO | FIGURE | NARRATOR | 0(OR) | 0.038 |
| YUZURU NAGAIWA | FIGURE | MUSIC | | 0.038 |
| NONORI ICHO | FIGURE | CAST | | 0.045 |
| HOMER | FIGURE | OTHERS | 0 | 0.030 |
| ANCIENT RUINS | KEYWORD | NOUN (GENERAL) | 5(OR) | 0.008 |
| GREECE | KEYWORD | NOUN (PLACE NAME) | | 0.013 |
| TURKEY | KEYWORD | NOUN (PLACE NAME) | | 0.013 |
| ASIAN-STYLE ARCHITECTURE | KEYWORD | NOUN (GENERAL) | | 0.008 |
| LYRICS | KEYWORD | NOUN (GENERAL) | | 0.008 |
| ILIOS CASTLE | KEYWORD | NOUN (PROPER) | 0 | 0.013 |
| ITHAKA | KEYWORD | NOUN (PLACE NAME) | 0 | 0.013 |
| SCAMANDER RIVER | KEYWORD | NOUN (PLACE NAME) | 0 | 0.013 |
| TROY | KEYWORD | NOUN (PLACE NAME) | 0 | 0.013 |

FIG.11M

| ARRANGEMENT CONDITION ID | SEARCH CONDITION | MINIMUM DEGREE OF ASSOCIATION | NUMBER | TOTAL NUMBER |
|---|---|---|---|---|
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 3 |
| 2 | AND(TREASURE!! ANCIENT HERITAGE Top 100, DOCUMENTARY/ CULTURE, HISTORY/TRAVEL, YURIKO KORETO, YUZURU NAGAIWA, NAONORI ICHO, OR(ANCIENT RUINS, GREECE, TURKEY, ASIAN-STYLE ARCHITECTURE, LYRICS)) | 0.578 | 2 | 5 |
| | AND(OR(DOCUMENTARY/CULTURE, HISTORY/TRAVEL, OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.296 | 0 | 5 |
| | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.159 | 0 | 5 |
| 3 | AND(OR(DOCUMENTARY/CULTURE, HISTORY/TRAVEL), OR(YURIKO KORETO, YUZURU NAGAIWA, NAONORI ICHO)) | 0.151 | 3 | 8 |
| 4 | AND(OR(DOCUMENTARY/CULTURE, HISTORY/TRAVEL), OR(ANCIENT RUINS, GREECE, TURKEY, ASIAN-STYLE ARCHITECTURE, LYRICS)) | 0.122 | 10 | 18 |
| 5 | AND(OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.046 | 2 | 20 |
| 6 | OR(YURIKO KORETO, YUZURU NAGAIWA, NAONORI ICHO) | 0.038 | 7 | 27 |
| 7 | OR(ANCIENT RUINS, GREECE, TURKEY, ASIAN-STYLE ARCHITECTURE, LYRICS) | 0.008 | 5 | 32 |

FIG. 11N

| CHARACTERISTIC INFORMATION | CHARACTERISTIC ELEMENT | | NUMBER | DEGREE OF ASSOCIATION |
|---|---|---|---|---|
| | TYPE | SUB TYPE | | |
| TREASURE!! ANCIENT HERITAGE Top 100 | TITLE | MAIN | 0 | 0.200 |
| HOMER IMMORTAL METROPOLIS | TITLE | SUB | 0 | 0.300 |
| DOCUMENTARY/CULTURE | CATEGORY | MAIN | 182(OR) | 0.114 |
| HISTORY/TRAVEL | CATEGORY | SUB | | 0.136 |
| YURIKO KORETO | FIGURE | NARRATOR | | 0.038 |
| YUZURU NAGAIWA | FIGURE | MUSIC | 0(OR) | 0.038 |
| NONORI ICHO | FIGURE | CAST | | 0.045 |
| HOMER | FIGURE | OTHERS | 0 | 0.030 |
| ANCIENT RUINS | KEYWORD | NOUN (GENERAL) | | 0.008 |
| GREECE | KEYWORD | NOUN (PLACE NAME) | | 0.013 |
| TURKEY | KEYWORD | NOUN (PLACE NAME) | 0(OR) | 0.013 |
| ASIAN-STYLE ARCHITECTURE | KEYWORD | NOUN (GENERAL) | | 0.008 |
| LYRICS | KEYWORD | NOUN (GENERAL) | | 0.008 |
| ILIOS CASTLE | KEYWORD | NOUN (PROPER) | 0 | 0.013 |
| ITHAKA | KEYWORD | NOUN | 0 | 0.013 |
| SCAMANDER RIVER | KEYWORD | NOUN (PLACE NAME) | 0 | 0.013 |
| TROY | KEYWORD | NOUN (PLACE NAME) | 0 | 0.013 |

FIG. 110

| ARRANGEMENT CONDITION ID | SEARCH CONDITION | MINIMUM DEGREE OF ASSOCIATION | NUMBER | TOTAL NUMBER |
|---|---|---|---|---|
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 3 |
| 2 | AND(TREASURE!! ANCIENT HERITAGE Top 100, DOCUMENTARY/CULTURE, HISTORY/TRAVEL, YURIKO KORETO, YUZURU NAGAIWA, NAONORI ICHO, OR(ANCIENT RUINS, GREECE, TURKEY, ASIAN-STYLE ARCHITECTURE, LYRICS)) | 0.578 | 2 | 5 |
|  | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.296 | 0 | 5 |
|  | AND(OR(DOCUMENTARY/CULTURE, HISTORY/TRAVEL), OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.159 | 0 | 5 |
| 3 | AND(OR(DOCUMENTARY/CULTURE, HISTORY/TRAVEL), OR(YURIKO KORETO, YUZURU NAGAIWA, NAONORI ICHO)) | 0.151 | 3 | 8 |
| 4 | AND(OR(DOCUMENTARY/CULTURE, HISTORY/TRAVEL), OR(ANCIENT RUINS, GREECE, TURKEY, ASIAN-STYLE ARCHITECTURE, LYRICS)) | 0.122 | 10 | 18 |
| 5 | AND(OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.046 | 2 | 20 |
| 6 | OR(YURIKO KORETO, YUZURU NAGAIWA, NAONORI ICHO) | 0.038 | 7 | 27 |
| 7 | OR(ANCIENT RUINS, GREECE, TURKEY, ASIAN-STYLE ARCHITECTURE, LYRICS) | 0.008 | 5 | 32 |
| 8 | AND(DOCUMENTARY/CULTURE, HISTORY/TRAVEL) | 0.250 | 12 | 44 |
| 9 | DOCUMENTARY/CULTURE | 0.114 | 170 | 214 |

FIG. 11P

| CHARACTERISTIC INFORMATION | CHARACTERISTIC ELEMENT | | NUMBER | DEGREE OF ASSOCIATION |
|---|---|---|---|---|
| | TYPE | SUB TYPE | | |
| TREASURE! ANCIENT HERITAGE Top 100 | TITLE | MAIN | 0 | 0.200 |
| HOMER IMMORTAL METROPOLIS | TITLE | SUB | 0 | 0.300 |
| DOCUMENTARY/CULTURE | CATEGORY | MAIN | 170 | 0.114 |
| HISTORY/TRAVEL | CATEGORY | SUB | | 0.136 |
| YURIKO KORETO | FIGURE | NARRATOR | | 0.038 |
| YUZURU NAGAIWA | FIGURE | MUSIC | 0 (OR) | 0.038 |
| NONORI ICHO | FIGURE | CAST | | 0.045 |
| HOMER | FIGURE | OTHERS | 0 | 0.030 |
| ANCIENT RUINS | KEYWORD | NOUN (GENERAL) | | 0.008 |
| GREECE | KEYWORD | NOUN (PLACE NAME) | | 0.013 |
| TURKEY | KEYWORD | NOUN (PLACE NAME) | 0 (OR) | 0.013 |
| ASIAN-STYLE ARCHITECTURE | KEYWORD | NOUN (GENERAL) | | 0.008 |
| LYRICS | KEYWORD | NOUN (GENERAL) | | 0.008 |
| ILIOS CASTLE | KEYWORD | NOUN (PROPER) | 0 | 0.013 |
| ITHAKA | KEYWORD | NOUN (PLACE NAME) | 0 | 0.013 |
| SCAMANDER RIVER | KEYWORD | NOUN (PLACE NAME) | 0 | 0.013 |
| TROY | KEYWORD | NOUN (PLACE NAME) | 0 | 0.013 |

FIG. 15A

| GROUP ID | 1 | | | | |
|---|---|---|---|---|---|
| ATTRIBUTE | TITLE | | | | |
| ARRANGEMENT SLOT ID | POSITIONAL COORDINATES | | | CONTENT ALLOCATION SEQUENCE | ALLOCATED CONTENT ID |
| | x | y | z | | |
| 1 | 1.00 | 0.00 | 5.00 | 1 | — |
| 2 | 2.00 | 0.00 | 4.00 | 2 | — |
| 3 | 3.00 | 0.00 | 5.00 | 3 | — |
| 4 | 4.00 | 0.00 | 2.00 | 4 | — |
| 5 | 5.00 | 0.00 | 1.00 | 5 | — |
| ⋮ | | | | | |

FIG. 15B

| GROUP ID | 2 | | | | |
|---|---|---|---|---|---|
| ATTRIBUTE | CATEGORY | | | | |
| ARRANGEMENT SLOT ID | POSITIONAL COORDINATES | | | CONTENT ALLOCATION SEQUENCE | ALLOCATED CONTENT ID |
| | x | y | z | | |
| 1 | 0.00 | 1.00 | 5.00 | 1 | — |
| 2 | 0.00 | 2.00 | 4.00 | 2 | — |
| 3 | 0.00 | 3.00 | 3.00 | 3 | — |
| 4 | 0.00 | 4.00 | 2.00 | 4 | — |
| 5 | 0.00 | 5.00 | 1.00 | 5 | — |
| ⋮ | | | | | |

FIG. 15C

| GROUP ID | 3 | | | | |
|---|---|---|---|---|---|
| ATTRIBUTE | KEY WORD | | | | |
| ARRANGEMENT SLOT ID | POSITIONAL COORDINATES | | | CONTENT ALLOCATION SEQUENCE | ALLOCATED CONTENT ID |
| | x | y | z | | |
| 1 | -1.00 | 0.00 | 5.00 | 1 | — |
| 2 | -2.00 | 0.00 | 4.00 | 2 | — |
| 3 | -3.00 | 0.00 | 3.00 | 3 | — |
| 4 | -4.00 | 0.00 | 2.00 | 4 | — |
| 5 | -5.00 | 0.00 | 1.00 | 5 | — |
| ⋮ | | | | | |

FIG. 15D

| GROUP ID | 4 | | | | |
|---|---|---|---|---|---|
| ATTRIBUTE | FIGURE | | | | |
| ARRANGEMENT SLOT ID | POSITIONAL COORDINATES | | | CONTENT ALLOCATION SEQUENCE | ALLOCATED CONTENT ID |
| | x | y | z | | |
| 1 | 0.00 | -1.00 | 5.00 | 1 | — |
| 2 | 0.00 | -2.00 | 4.00 | 2 | — |
| 3 | 0.00 | -3.00 | 3.00 | 3 | — |
| 4 | 0.00 | -4.00 | 2.00 | 4 | — |
| 5 | 0.00 | -5.00 | 1.00 | 5 | — |
| ⋮ | | | | | |

FIG. 16

| ARRANGEMENT CONDITION ID | SEARCH CONDITION | MINIMUM DEGREE OF ASSOCIATION | NUMBER | ARRANGEMENT SLOT GROUP | TOTAL NUMBER |
|---|---|---|---|---|---|
| 1 | AND(TREASURE!! ANCIENT HERITAGE Top 100, HOMER IMMORTAL METROPOLIS, DOCUMENTARY/CULTURE, HISTORY/TRAVEL, YURIKO KORETO, YUZURU NAGAIWA, NAONORI ICHO, HOMER, ANCIENT RUINS, GREECE, TURKEY, ASIAN-STYLE ARCHITECTURE, LYRICS, ILIOS CASTLE, ITHAKA, SCAMANDER RIVER, TROY) | 1.000 | 3 | 1 | 3 |
| 2 | AND(TREASURE!! ANCIENT HERITAGE Top 100, DOCUMENTARY/CULTURE, HISTORY/TRAVEL, YURIKO KORETO, YUZURU NAGAIWA, NAONORI ICHO, OR(ANCIENT RUINS, GREECE, TURKEY, ASIAN-STYLE ARCHITECTURE, LYRICS)) | 0.578 | 2 | 1 | 5 |
| 3 | AND(OR(DOCUMENTARY/CULTURE, HISTORY/TRAVEL), OR(YURIKO KORETO, YUZURU NAGAIWA, NAONORI ICHO)) | 0.151 | 3 | 2 | 3 |
| 4 | AND(OR(DOCUMENTARY/CULTURE, HISTORY/TRAVEL), OR(ANCIENT RUINS, GREECE, TURKEY, ASIAN-STYLE ARCHITECTURE, LYRICS)) | 0.122 | 10 | 2 | 13 |
| 5 | AND(OR(YURIKO KORETO, YUZURU NAGAIWA, NAONORI ICHO), OR(ANCIENT RUINS, GREECE, TURKEY, ASIAN-STYLE ARCHITECTURE, LYRICS)) | 0.046 | 2 | 4 | 2 |
| 6 | OR(YURIKO KORETO, YUZURU NAGAIWA, NAONORI ICHO) | 0.038 | 7 | 4 | 9 |
| 7 | OR(ANCIENT RUINS, GREECE, TURKEY, ASIAN-STYLE ARCHITECTURE, LYRICS) | 0.008 | 5 | 3 | 5 |
| 8 | AND(DOCUMENTARY/CULTURE, HISTORY/TRAVEL) | 0.250 | 12 | 2 | 25 |
| 9 | DOCUMENTARY/CULTURE | 0.114 | 170 | 2 | 195 |

DATA DISPLAY APPARATUS, METHOD, AND PROGRAM

CROSS-REFERENCE TO RELATED APPLICATIONS

This application is based upon and claims the benefit of priority from the prior Japanese Patent Application No. 2009-075044, filed on Mar. 25, 2009; the entire contents of which are incorporated herein by reference.

BACKGROUND OF THE INVENTION

1. Field of the Invention

The present invention relates to display.

2. Description of the Related Art

A search function of a PC is a common technique in wide use in daily works. In the PC, a user inputs a keyword to search for desired data (for example, contents and the like). Further, some AV equipment such as TV, DVD recorders, and HDD recorders also has a data search function (JP-A 2008-242504).

BRIEF SUMMARY OF THE INVENTION

In recent years, the capacity of memory devices built in or externally attached to AV equipment has been increasing. Further, owing to the connection of the AV equipment to the Internet, an amount of data retrievable by a user is rapidly increasing. As a result, it takes a longer time for a list of desired data to be displayed. In order to display desired data based on the priority or the like, the calculation of priority levels of all the data is necessary. As a result, it takes a still longer time for a list of the data to be displayed. In view of the above, it is an object of the present invention to provide a data display apparatus, method, and program in which display delay when desired data are displayed is reduced.

A display apparatus according to one aspect of the present invention includes: a first memory to store a plurality of contents and pieces of content information corresponding to the plural contents respectively, the content information including a plurality of elements; an element selector to select at least part of the plural elements correspond to a first content among the plural contents; a determine unit to determine whether or not a selected element matches the plural elements correspond to the contents stored in the first memory unit except the first content; a generator to generate corresponding information for each of the contents stored in the first memory based on a result of a determination, the corresponding information showing a correspondence relation between degrees of association to the first content and arrangement positions; a second memory to store pieces of the corresponding information generated by the generator; a content selector to select a second content from the plural contents; a calculator to calculate degrees of association to the second content by determining whether or not the plural elements correspond to the second content match the plural elements correspond to the contents stored in the first memory except the second content based on a result of the determination; a deciding unit, by referring to the second memory, to decide the arrangement positions of the plural contents except the second content according to the degrees of association calculated by the calculator; and a display unit to display the contents at the arrangement positions decided by the deciding unit.

BRIEF DESCRIPTION OF THE DRAWINGS

FIG. 2 is a chart showing metadata of a content.

FIG. 4C is a chart showing arrangement slot information.

FIG. 5 is a chart showing content characteristic information.

FIG. 6 is a chart showing table data.

FIG. 7 is a chart showing table data.

FIG. 8 is a chart showing content arrangement conditions.

FIG. 10 is a chart showing statistical information.

FIGS. 11A-11P is a chart showing a calculation process of the content arrangement conditions.

FIG. 15A is a chart showing arrangement slot information.

FIG. 15B is a chart showing arrangement slot information.

FIG. 15C is a chart showing arrangement slot information.

FIG. 15D is a chart showing arrangement slot information.

FIG. 16 is a chart showing content arrangement conditions.

DETAILED DESCRIPTION OF THE INVENTION

Hereinafter, an embodiment of the present invention will be described in detail with reference to the drawings.

First Embodiment

First, the outline of a data display apparatus 1 according to a first embodiment will be described. In the first embodiment, the data display apparatus 1 will be described, taking a digital TV as an example. Further, it is assumed that data to be displayed as a list are contents. The data display apparatus 1 is not limited to the digital TV. The data display apparatus 1 may be a HDD recorder, a PC, a television set, a mobile phone, a PDA (personal digital assistant), a car navigation system, or the like.

In recent years, in more and more occasions, a user selects data displayed on a display screen. Meanwhile, capacities of memory devices such as a HDD are increasing and broadband networks are becoming popular. Accordingly, the number and kinds of contents displayed as selection targets on a screen and an amount of information of contents are increasing.

When there are many contents that are search targets, a user sometimes does not know details of the contents. Therefore, a method of searching for a content according to a keyword input by a user has a difficulty in efficiently retrieving the desired content.

In the first embodiment, contents having association with a given content (hereinafter, referred to as a reference content) are arranged according to their degrees of similarity (degrees of association). In the first embodiment, a content having a high degree of association to the reference content is arranged at a position close to the reference content (see FIG. 4A and FIG. 4B).

A user selects an arbitrary content from a content group arranged according to the degrees of association to the reference content. Then, the selected content is set as a new reference content, and according to the degrees of association to the new reference content, the contents are re-arranged around the reference content. The user selects an arbitrary content from the newly arranged content group. The user retrieves a desired content by repeating this operation.

According to the above-described search method, even when the user does not clearly know details of a desired content, he/she can efficiently specify the desired content by checking the contents displayed as a list. Further, at the time of the list display of the contents, the data display apparatus 1 according to the first embodiment uses 3D graphics. Therefore, a change of the arrangement of each display target can be displayed in animation in response to a user's operation, which enables the user to easily specify the desired data.

Figure 1:
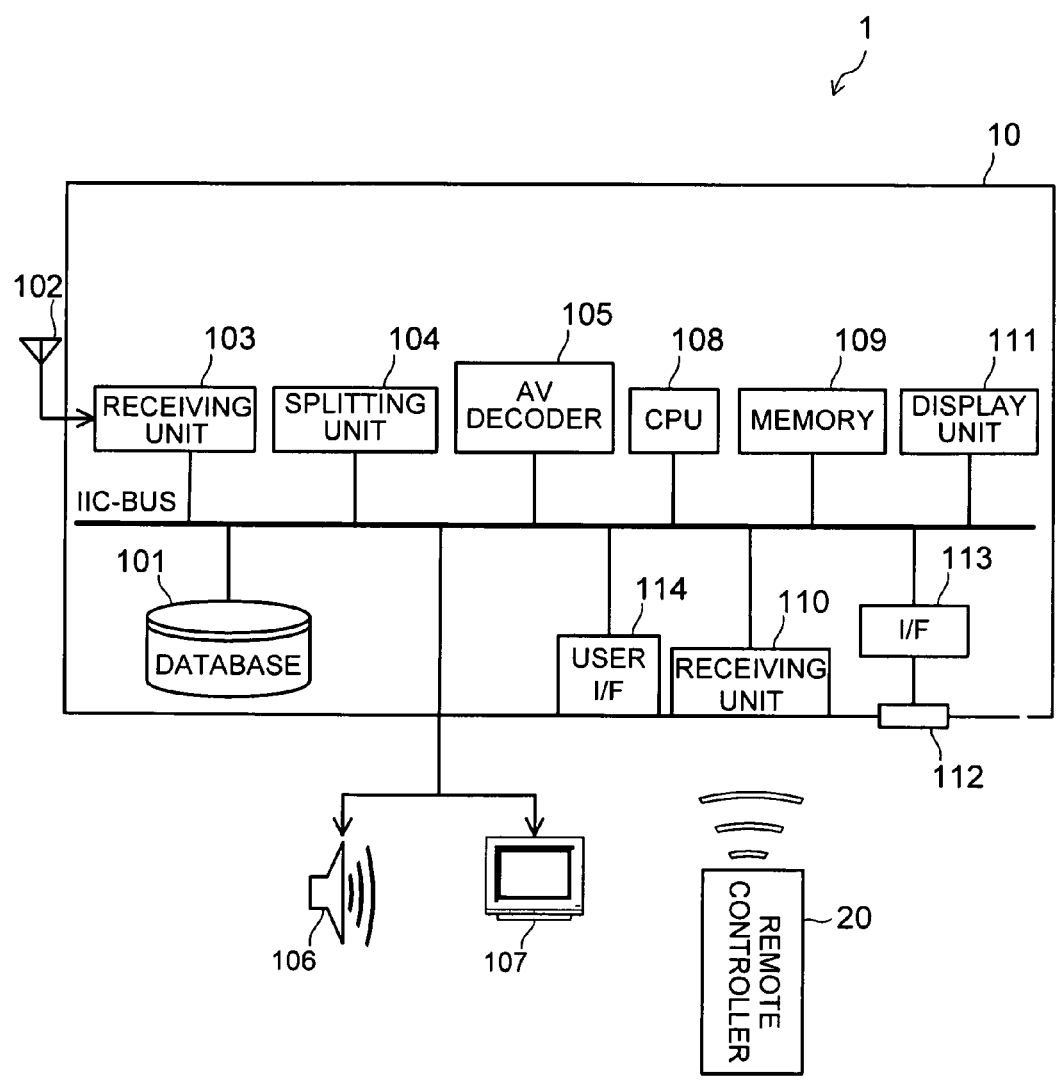
FIG. 1 is a block diagram showing a data display apparatus according to a first embodiment.

FIG. 1 is a diagram showing an example of the structure of the data display apparatus 1 according to the first embodiment. The data display apparatus 1 according to the first embodiment is structured such that an antenna 102, a speaker 106, and a monitor 107 are connected to a STB (set top box) 10. The STB 10 includes a HDD 101 (first memory), a receiving unit 103, a splitting unit 104, an AV decoder 105, a CPU 108, a memory 109, a receiving unit 110, a terminal 112, an I/F 113, and a user I/F 114.

The HDD 101 is a database in which a plurality of contents, metadata of the contents (hereinafter, referred to as content information), and soon are stored. Each of the contents is assigned an identification number (ID). Instead of the HDD 101, a SSD which is a memory device using a flash memory, or the like, may be used. The contents may be any data presentable to a user, such as moving image data, video data, audio data, text data, figure data, book data, merchandise data, presentation files, and so on. Besides, the contents may be data having arbitrary attribute values, such as image data, weather information, and traffic information. In the first embodiment, a description will be given of a case where the contents are moving image data.

In the HDD 101, there are stored recorded TV programs, contents downloaded from Web sites on networks, and so on. In the HDD 101, these contents are stored as files encoded by using a known codec. A saving format of the contents is not specifically limited.

Pieces of the content information are stored in correspondence to the respective contents stored in the HDD 101. The content information is accompanying information regarding the content. When the content is moving image data, title, category, outline, reproduction time, recording, or the like are the content information. Besides, arbitrary information regarding the content such as broadcast station, cast, producer, start time, end time, parental rate (age limit), or owner is also the content information.

FIG. 2 is a chart showing an example of the content information stored in the HDD 101. FIG. 2 shows an example where the content is a TV program. In this case, "content ID", "title", "category", "broadcasting start time", "broadcasting end time", "outline", and "details" are set as items of the content information. Values are stored in correspondence to the respective items.

When the content is a recorded TV program, the content information is obtained from EPG (electronic program guide) information. When the content is one downloaded from a Web site on a network, the content information provided from a network service or the like is obtained. In the HDD 101, these pieces of content information are stored as files described in a known format. A saving format is not specifically limited. In the first embodiment, the HDD 101 is a local database built in the data display apparatus 1, but may be a database on a network.

The antenna 102 receives digital broadcast signals transmitted from broadcast stations. The digital receiving unit 103 selects a desired channel from the digital broadcast signals received by the antenna 102. The digital receiving unit 103 demodulates the selected digital broadcast signal to generate TS (transport stream).

The splitting unit 104 separates the broadcast signal, SI/PSI, and the like from the TS generated by the receiving unit 103. The TS is a multiplexed signal including the broadcast signal, SI/PSI, and so on. The broadcast signal is a broadcast signal of MPEG-2 or the like. The broadcast signal includes audio ES (audio elementary stream) and video ES (video elementary stream) which are coded video and audio respectively. The PSI is information describing what programs the TS contains and to which program each ES contained in the TS belongs. Further, the SI contains EPG information.

The AV decoder 105 decodes the broadcast signal, which is separated by the splitting unit 104, into a video signal and an audio signal. Normally (when the content is reproduced without being recorded), the video signal is output to the monitor 107 and the audio signal is output to the speaker 106. At the time of the recording, the video signal and the audio signal are stored in the HDD 101. At this time, the EPG information contained in the SI/PSI is stored in the HDD 101 together with the video signal and the audio signal. The EPG information is used as the content information at the time of content search.

The CPU 108 controls the entire data display apparatus 1. The memory 109 is composed of ROM, RAM, NVRAM (nonvolatile random access memory), and the like. The ROM stores programs and the like used for causing the CPU 108 to operate. The RAM is a working area used when the CPU 108 operates.

Figure 3:
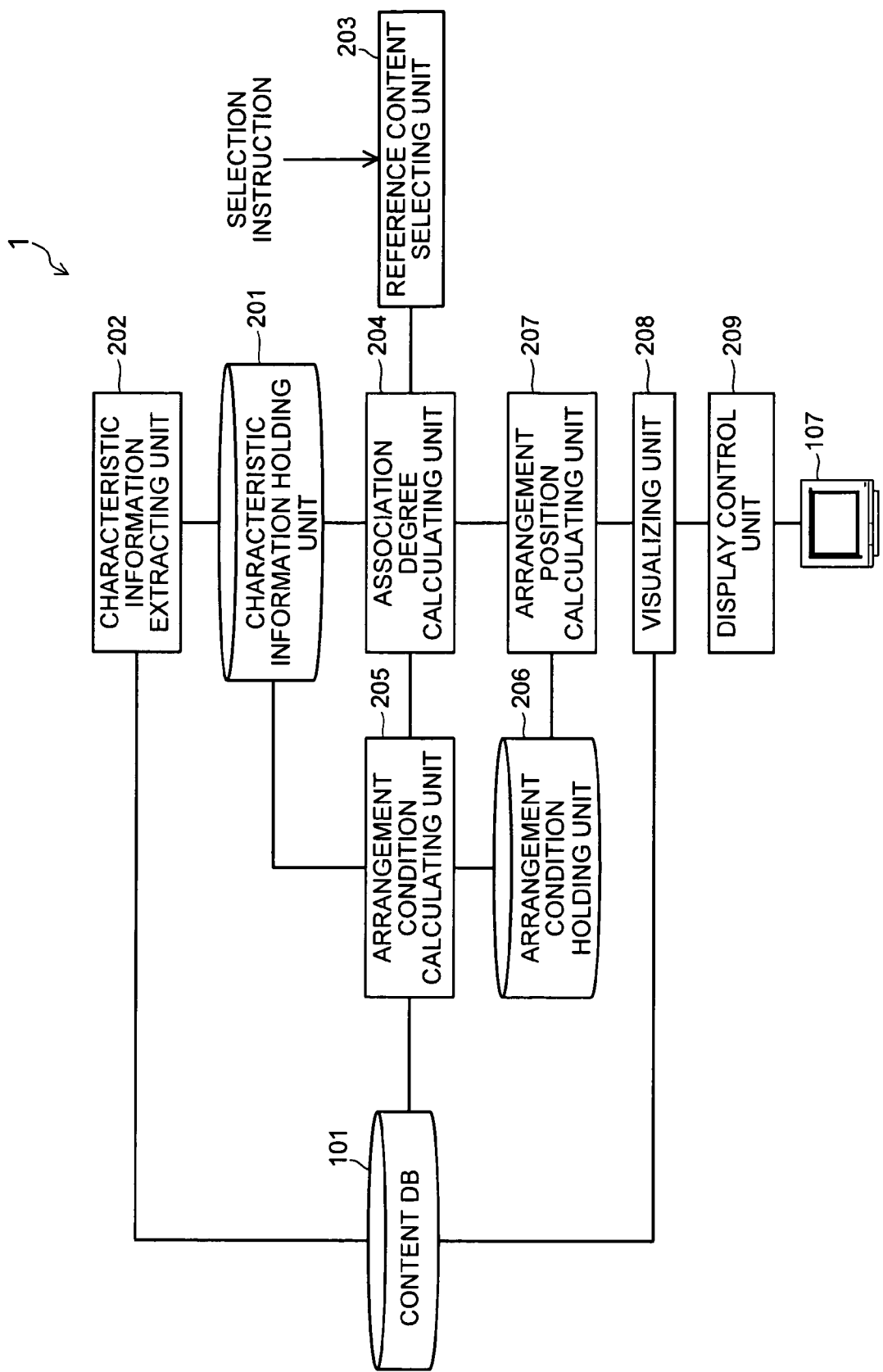
FIG. 3 is a block diagram showing a data display apparatus according to a first embodiment.

FIG. 3 is a diagram showing an example of a functional structure of the data display apparatus 1 according to the first embodiment. Functions of a characteristic information extracting unit 202 (extracting unit), a reference content selecting unit 203 (selector), an association degree calculating unit 204 (calculator), an arrangement condition calculating unit 205 (generator), an arrangement position calculating unit 207 (deciding unit), a visualizing unit 208, and a display control unit 209 (display unit) are realized by the CPU 108 executing the programs stored in the ROM. Further, functions of a characteristic information holding unit 201 and an arrangement condition holding unit 206 (second memory) are realized by the memory 109. Details of these functions will be described later.

The receiving unit 110 receives an operation signal such as an infrared ray wirelessly transmitted from a remote controller 20. The remote controller 20 includes various kinds of keys such as a "cursor" key and an "enter" key necessary for operating the data display apparatus 1.

The user I/F 114 is connected to a key input unit, not shown. The user I/F 114 accepts the operation signal generated according to the operation of the input unit by a user. The key input unit is an operation button of the data display apparatus 1 main body. The key input unit includes various kinds of keys necessary for operating the data display apparatus 1, similarly to the remote controller 20.

The terminal 112 is a terminal connecting an external memory device such as a USB memory, a SD memory card, a DVD recorder, and a HDD recorder. The I/F 113 is an interface via which data are transmitted/received to/from the external memory device connected to the terminal 112 from/to the CPU 108.

A user is capable of copying a content from the external memory device connected to the terminal 112 to the HDD 101 by operating the remote controller 20 or the input key. A content registered in a Web site on the Internet may be downloaded to the HDD 101 through a LAN cable connected to the terminal 112.

The speaker 106 is an audio output device outputting the audio signal input from the AV decoder 105. The monitor 107 is a display device displaying the video signal input from the AV decoder 105. The display device may be a LCD, aPDP, or the like. The display unit 111 displays a reference content selection window on the monitor 107.

Figure 4A:
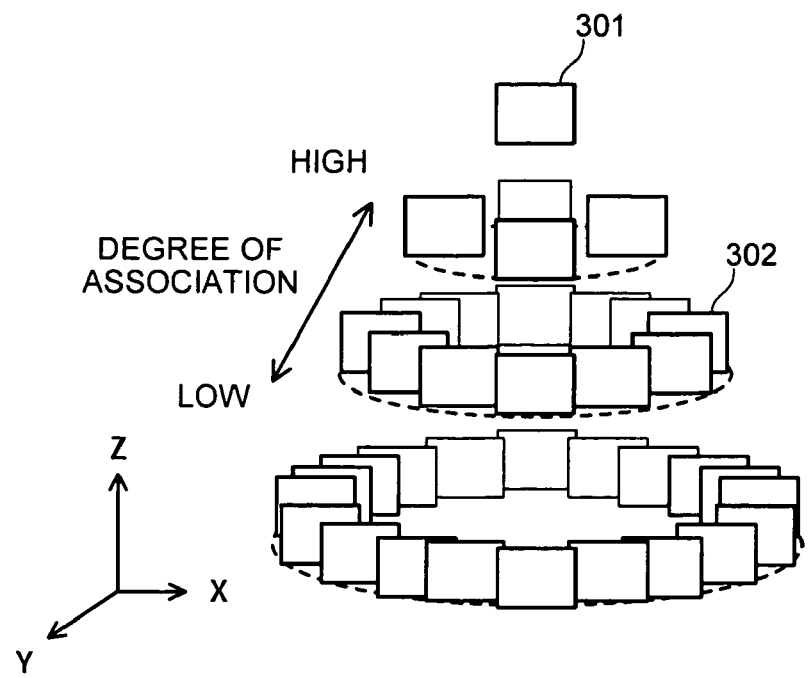
FIG. 4A is a view showing list display of contents.

FIG. 4A is a view showing an example of list display of contents. In the first embodiment, for the list display of the contents, a plurality of arrangement slots arranged in a positional coordinate system in a conical surface shape are defined. At the arrangement slots, content display data are displayed. The content display data are data of identification information and the like of the contents, such as names, attribute information, and thumbnail images of the contents. One content display data is arranged at one arrangement slot.

Content display data 301 shown in FIG. 4A is content display data of a content selected by a user (hereinafter, referred to as a reference content). The content display data of the reference content is displayed at the apex of the coordinate system in the conical surface shape as shown in FIG. 4A. The arrangement slots of the content display data of the other contents are decided based on their degrees of association to the reference content. Then, the content display data are displayed at the decided arrangement slots. In the first embodiment, a content having a higher degree of association to the content display data 301 of the reference content is allocated to an arrangement slot nearer to the content display data 301.

In the first embodiment, the content display data are arranged in a virtual three dimensional space (hereinafter, referred to as a virtual space) formed by the positional coordinate system in the conical surface shape shown in FIG. 4A. An observation point in the virtual space is changeable, and a user can set various display manners by changing the observation point in the positional coordinate system in the conical surface shape. For example, a user can also select a display manner shown in FIG. 4B.

Figure 4B:
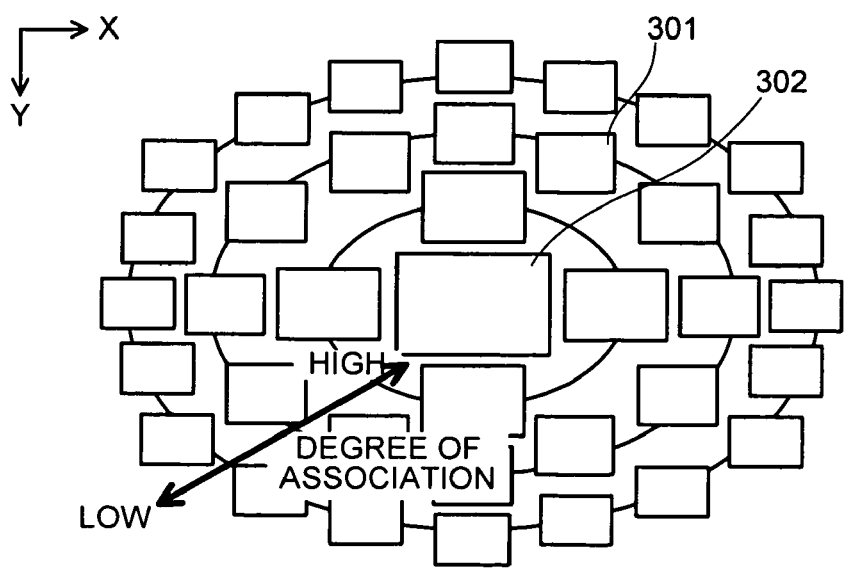
FIG. 4B is a view showing list display of the contents.

FIG. 4C is a chart showing an example of arrangement slot information defining the positions of the arrangement slots in the display manner shown in FIG. 4B. When a user selects content display data, the arrangement of the content display data is changed based on the selected content display data. Incidentally, the virtual space in which pieces of representative information of the contents are arranged is not limited to the coordinate system in the conical surface shape shown in FIG. 4A and FIG. 4B. For example, the content display data may be displayed in a three dimensional grid or in a two dimensional grid.

A user selects arbitrary content display data from the displayed content display data group by operating the remote controller 20 or the key input unit. For example, when he/she selects content display data 302, a content corresponding to the selected content display data 302 is set as a new reference content and content display data of the other contents are re-arranged according to their degrees of association to this reference content. The user retrieves a desired content by repeating the selection of the content display data displayed on the monitor 107.

Incidentally, the data display apparatus 1 may automatically select the reference content. Various methods may be used as a method of selecting the reference content. An example of the method may be to monitor a viewing state (reproduction state) of each of the contents stored in the HDD 101 and a currently viewed content is set as the reference content. Alternatively, when no content is currently viewed, a content most recently viewed may be set as the reference content.

Next, the functional structure of the data display apparatus 1 according to the first embodiment will be described with reference to FIG. 3. In the characteristic information holding unit 201, content characteristic information extracted by the characteristic information extracting unit 202 is stored. FIG. 5 is a chart showing an example of the content characteristic information stored in the characteristic information holding unit 201.

FIG. 5 shows the content characteristic information extracted by the characteristic information extracting unit 202 from the content information shown in FIG. 2. In the first embodiment, the content characteristic information corresponding to each content is extracted. In each of the content characteristic information, a content ID as identification information of the corresponding content is stored. FIG. 5 shows an example where the content information is content information of moving image data. When the content is moving image data, characteristic elements are "title characteristic", "category characteristic", "keyword characteristic", and "figure characteristic".

Type and value are stored in correspondence to each of the characteristic elements. For example, "main" representing a main title and "sub" representing a subtitle are stored as types in correspondence to the title characteristic. Further, as the value, a partial character string of a corresponding title is stored in correspondence to each type. Incidentally, "number" such as a serial number in the same title, for example, story number of a drama series may be stored as the type.

In correspondence to the figure characteristic, relations to the content such as "cast" and "narrator" are used as the type, and the names of figures corresponding to the types are stored as the values. In correspondence to the category characteristic, "main", "sub", and the like indicating a hierarchical structure of a category are used as the types, and category codes corresponding to the types are stored as the values. Further, in such a case where a plurality of categories are given, each category may be identified by the number appended to the end of the type. In correspondence to the keyword characteristic, values indicating meanings of keywords such as "noun (place name)", "noun (proper)", and the like are used as the types and the corresponding keywords are stored as the values.

The characteristic information extracting unit 202 reads out the content information stored in the HDD 101 to extract the content characteristic information shown in FIG. 5. The extraction of the content characteristic information can be realized by applying a technique such as semantic class analysis to the content information. As such an extracting method, there is, for example, a method described in "Toshiba Review 2007 Vol. 62 No. 12 pp 54-57 Chaining Search Interface "SASATTO Search" by MASARU Suzuki, ISHITANI Yasuto, and SAKAMOTO Kei".

By preparing a dictionary, a pattern, and a rule for each extracted characteristic, it is possible to extract a word from a character string and to allocate a type as a semantic class. Further, by classifying the content information items, which are extraction origins, according to the extracted characteristic, it is possible to reduce the number of characteristics extracted as errors. For example, the title characteristic only needs to be extracted from the title item of the content information.

When the contents a removing images, the contents themselves sometimes become the content information in view of whether or not the results of face detection from the images match or whether or not histograms of the images are similar.

In this case, the characteristic information extracting unit 202 reads out the contents as the content information from the HDD 101.

As described above, in the first embodiment, the content characteristic information is extracted from the content information. For example, when the same moving image data is distributed as a TV program and VOD (Video-On-Demand) (when the kinds and classifications of the contents are different, or when description methods of the content information are different), pieces of the extracted content characteristic information have similar tendencies, and therefore the degree of association between the contents can be calculated by a common criteria.

The characteristic information extracting unit 202 extracts the content characteristic information at a predetermined timing not directly involved in the display of the contents (for example, on the background). The characteristic information extracting unit 202 stores the extracted content characteristic information in the characteristic information holding unit 201. The prior extraction of the content characteristic information enables a reduction in processing load when the association degree calculating unit 204 calculates the association degree between the contents.

The reference content selecting unit 203 decides a new reference content for the list display based on the operation signal from the receiving unit 110 or the user I/F 114. Consequently, the reference content designated by a user is selected. A content selection device is not limited to the remote controller 20 or the key input unit. The content selection device may be a touch panel, a mouse, an acceleration sensor, or the like.

When the mouse is used to select the reference content, if the contents have already been displayed as the list on the monitor 107, a content displayed in an area including a position of a mouse pointer is set as a new reference content, according to position information of the mouse pointer at the time of the user's selection designation. If there is no content displayed in the area including the position of the mouse pointer, no selection of the reference content takes place. Further, when the list of contents is not displayed, the data display apparatus sets a most recently decided reference content as the reference content again.

When a keyboard or a remote controller is used to select the reference content, a correspondence relation is established in advance between keys and the arrangement slots on the list display. Another alternative may be to display a cursor and select a specific content by the combination of the cursor movement by an arrow key and an enter key. When the correspondence relation has been established between the keys and the arrangement slots, it is possible to discern the reference content directly based on a key code. When the cursor is displayed, the reference content is discerned by finding the arrangement slot that matches a focus area of the cursor.

As described above, the reference content selecting unit 203 selects the reference content based on the operation signal from the receiving unit 110 or the user I/F 114. Then, the reference content selecting unit 203 instructs the association degree calculating unit 204 to change the reference content.

The association degree calculating unit 204 calculates the degree of association between the content designated by the reference content selecting unit 203 (reference content) and a contents whose degree of association is to be calculated (hereinafter, referred to as a target content). The association degree calculating unit 204 reads out the content characteristic information stored in the characteristic information holding unit 201 to calculate the degree of association between the reference content and the target content.

The association degree calculating unit 204 determines a matching degree between the content characteristic information of the reference content and each of the characteristic elements of the content characteristic information of the target content. Each of the characteristic elements is given a weighting factor. The association degree calculating unit 204 multiplies the matching degree of each of the characteristic elements by the weighting factor and adds values obtained for all the characteristic elements. A value equal to the sum of the values obtained for all the characteristic elements is the degree of association.

FIG. 6 is a chart showing an example of table data defining the weighting factors of the characteristic elements. FIG. 6 shows an example where the content is moving image data. In the example shown in FIG. 6, the weighting factors of the title characteristic, the category characteristic, the figure characteristic, and the keyword characteristic are 0.5, 0.25, 0.15, and 0.1 respectively.

FIG. 7 is a chart showing an example of table data defining ratios of the characteristic elements. FIG. 7 shows an example where the content is moving image data. Here, the weighting factor to be multiplied is not set for each of the values of the characteristic elements, but a ratio is set for each of the types. This is because there is a possibility that the characteristic information of the same type exists in plurality.

When the reference content and the target content completely matches each other in terms of the title characteristic, the degree of association in terms of the title characteristic is 1. Further, when only part of the title characteristic matches, a value of the degree of association is decided according to the type of the matching characteristic.

When the content characteristic information of the reference content has a plurality of characteristics of the same type, the ratio is normalized according to the appearance frequency of the type. In this case, an actual weight for each type is calculated by the following expression (1)

[Expression 1]

$$W_i = \frac{\omega_i}{\sum_i \omega_i \times \text{count}(i)} \qquad (1)$$

In the expression (1), i is a suffix representing the type. $W_i$ is a weighting factor of type i. $\omega_{ip}$ is a ratio of type i defined in the table data shown in FIG. 7. count (i) is the number of the characteristic information of the type i included in the content characteristic information of the reference content. That is, count (i) represents how many values of the type i the content characteristic information of the reference content has. By using the expression (1), it is possible to set the weight of each of the types according to the appearance frequency of the type.

In the keyword characteristic of the content characteristic information shown in FIG. 5, one value is noun (proper), three values are nouns (general), and five values are nouns (place name). By applying the above expression (1) to each of the types of the keyword characteristic of the content characteristic information, the weight of each of the types is calculated. The weight of the noun (proper), the weight of the noun (general), and the weight of the noun (place name) are calculated as 0.125, 0.083, and 0.125 respectively.

For example, it is assumed that the weighting factors of the characteristic elements are set as shown in FIG. 6 and the degrees of association of the characteristic elements are calculated as follows.

| | |
|---|---|
| degree of association of the title characteristic | 0.25 |
| degree of association of the figure characteristic | 0.03 |
| degree of association of the category characteristic | 0.125 |
| degree of association of the keyword characteristic | 0.02 |

In this case, a degree of association R between contents is calculated in such a manner that the degree of association of each of the characteristic elements is multiplied by the weighting factor and the resultant values for all the characteristic elements are added. Calculating the expression (2) below gives 0.425 as the degree of association R.

[Expression 2]

$$R=(0.5\times0.5)+(0.15\times0.2)+(0.25\times0.5)+(0.1\times0.2) \quad (2)$$

By calculating the degree of association between the contents as the sum of the weighted degrees of association of the respective characteristic elements as described above, it is possible to control levels of importance of the respective characteristic elements.

In the above-described example, the weighting factor of the title characteristic is set to have a large value so that the title characteristic is given the highest level of importance. However, when a user gives priority to the degree of association between the contents in terms of the figure, the weighting factors may be changed so that the weighting factor of the figure characteristic has a large value. Thus preparing a plurality of pieces of weight setting information makes it possible to calculate the degrees of association according to different users and different purposes of the content search. The calculation of the degrees of association of the characteristic elements is not limited to the above method. For example, the distance between characteristics calculated by using an existing technique such as ontology may be set as the degree of association.

The arrangement condition calculating unit 205 reads out the content characteristic information stored in the characteristic information holding unit 201, and calculates conditions for deciding the arrangement of associated contents (content arrangement conditions) on assumption that a given content is set as the reference content. Details of a method of calculating the content arrangement condition will be described with reference to FIG. 10 and FIG. 11A to FIG. 11P. Here, the outline of the arrangement condition calculating unit 205 will be described.

The arrangement condition calculating unit 205 confirms an update state of the contents stored in the HDD 101 every certain time interval, that is, periodically. When a content has been newly stored in the HDD 101 or when a content has been deleted from the HDD 101, the arrangement condition calculating unit 205 calculates the content arrangement conditions. The arrangement condition calculating unit 205 holds an ID list of the contents stored in the HDD 101, and compares the held ID list and IDs of the contents stored in the HDD 101 to confirm the update state of the contents. The content arrangement condition will be described below.

In the first embodiment, as for a group of the contents which are stored in the HDD 101 and are possible arrangement targets, values of the degrees of association on assumption that a given content is set as the reference content are divided into a plurality of ranges based on the combination of the elements of the characteristic information of the reference content. Then, the number of contents whose degrees of association fall within each of the association degree ranges is calculated and the resultant numbers obtained for the respective association degree ranges are set as the content arrangement conditions. By thus setting the content arrangement conditions, based on the number of contents whose degree of associations fall within each of the association degree ranges, the arrangement slots to which the contents are to be allocated can be decided successively after the degrees of association between the contents are calculated.

FIG. 8 is a chart showing an example of the content arrangement conditions. In the example shown in FIG. 8, the content arrangement condition is composed of information including content ID, arrangement condition ID, search condition composed of the combination of the elements included in the content characteristic information, the number of retrieved contents when the HDD 101 is searched under the search condition, and a minimum value of the degree of association that a content having the content information including the combination of the elements in the search condition can take. The arrangement condition calculating unit 205 calculates the content arrangement conditions for each of the contents stored in the HDD 101 and stores them in the arrangement condition holding unit 206 (to be described later).

The search condition will be described with reference to FIG. 8. When AND (element 1 (for example, Homer), element 2, element N) is shown, contents each having content information including all the element 1 to element N are searched for. Further, when OR (element 1, element 2, . . . , element N) is shown, contents each including one element or more among element 1 to element N is searched for. Further, AND and OR each can be nested. For example, when the search condition is AND (element 1, OR (element 2, element 3), element 4), contents each including both element 1 and element 4 and including one or more of element 2 and element 3 are searched for.

As described above, since the number of the retrieved contents is registered in correspondence to each of the content arrangement conditions in descending order of the minimum degree of association, it is possible to establish a correspondence relation between the association degree ranges and the arrangement slots. Let us describe the case of the arrangement condition 2 (whose arrangement condition ID is 2) in FIG. 8. The number of contents corresponding to the arrangement condition 1 (whose arrangement condition ID is 1) is 3. Therefore, the arrangement slots 1 to 3 (the arrangement slots whose IDs are 1 to 3) are allocated to the arrangement condition 1. Further, since the number of contents corresponding to the arrangement condition 2 is 2, the arrangement slots 4 and 5 (arrangement slots whose IDs are 4 and 5) are allocated to the arrangement condition 2.

The degrees of association whose correspondence relation is established with the arrangement slots 4 and 5 are lower than the minimum degree of association corresponding to the arrangement condition 1 and are equal to or higher than the minimum degree of association corresponding to the arrangement condition 2. The following expression (3) is an expression showing a range of a degree of association $R_2$ corresponding to the arrangement condition 2.

[Expression 3]

$$0.578 \leq R_2 < 1.000 \quad (3)$$

In the above-described manner, by the arrangement condition, the correspondence relation is established between the degrees of association and the arrangement slots. Therefore, without calculating the degrees of association of all the contents, it is possible to decide the arrangement slots based on the values of the degrees of association of the individual contents. In the case of the example shown in FIG. 8, it is possible to decide that a content whose value of the degree of association is 0.600 is to be allocated to one of the arrangement slots 4 and 5.

In order to display the contents as a list in an orderly manner based on the degrees of association to the reference content, it is necessary to calculate the degrees of association of all the contents to the reference content and thereafter sort them in descending order of the degree of association to decide the arrangement positions. Therefore, as the number of contents increases, it takes a longer time for the calculation of the degrees of association and the sorting, and the time from the display instruction to the actual display becomes longer. This causes display delay. In this case, by calculating, in advance, the degrees of association for all the combinations of the contents on assumption that each of the contents is set as the reference content, it would be possible to prevent the display delay. However, this would result in an enormous amount of data of the degree of association and thus is not realistic.

However, by calculating the above-described content arrangement conditions to store them in the arrangement condition holding unit 206 (to be described later), it is possible to decide the position where each content is to be arranged, immediately after calculating its degree of association to the reference content. That is, this eliminates a need to calculate the degrees of association of all the contents (except the reference content) stored in the HDD 101 to the reference content before deciding the arrangement position of each content. Therefore, even when a large number of contents are stored in the HDD 101, it is possible to prevent the display delay when the display manner is changed due to a change of the reference content.

In the arrangement condition holding unit 206, the content arrangement conditions calculated by the arrangement condition calculating unit 205 as shown in FIG. 8 are stored. The arrangement condition calculating unit 205 calculates the content arrangement conditions and stores the calculated content arrangement conditions in the arrangement condition holding unit 206. This can reduce a calculation load at the time when the arrangement positions of the content display data are calculated for the list display. Incidentally, the calculation of the content arrangement conditions and the storage thereof in the arrangement condition holding unit 206 take place at a timing not directly involved in the list display (for example, on the background).

The arrangement position calculating unit 207 refers to the degrees of association calculated by the association degree calculating unit 204 and the content arrangement conditions stored in the arrangement condition holding unit 206. Then, the arrangement position calculating unit 207 allocates contents which are current processing targets to the arrangement slots. The arrangement position calculating unit 207 has the arrangement slot information shown in FIG. 4C stored therein and registers the IDs of the contents to the arrangement slot information in correspondence to the IDs of the arrangement slots, thereby allocating the contents to the arrangement slots.

The arrangement position calculating unit 207 obtains the content arrangement conditions of the reference content from the arrangement condition holding unit 206. The arrangement position calculating unit 207 obtains from the association degree calculating unit 204 the degree of association of the content to be processed (processing target content) whose arrangement position is to be calculated. The arrangement position calculating unit 207 compares the degree of association of the processing target content with the values of the minimum degrees of association corresponding to the obtained content arrangement conditions in ascending order of the arrangement condition ID and determines to which of the arrangement conditions the processing target content corresponds.

By determining which of the arrangement conditions the current processing target content corresponds in the above-described manner, the arrangement position calculating unit 207 decides a range of the arrangement slots to which the current processing target content is to be allocated. The first arrangement slot in this range is the arrangement slot after the arrangement slot having ID (content allocation sequence) equal to a value of the total number of contents corresponding to the arrangement condition whose minimum degree of association is higher than the degree of association of the processing target content, and the last arrangement slot in this range is the arrangement slot having the content allocation sequence equal to a value which is obtained when the sum of the numbers of contents corresponding to the arrangement condition 1 to the arrangement condition whose minimum degree of association is higher than the degree of association of the processing target content is added to the number of contents corresponding to the relevant group.

This will be described, taking the content arrangement conditions shown in FIG. 8 as an example. For example, when the degree of association of the processing target content is 0.6, the comparison with the minimum degrees of association of the arrangement conditions leads to the understanding that the processing target content corresponds to the arrangement condition 2 and further the ID number of the arrangement slot is 4 or 5.

The arrangement position calculating unit 207 normalizes the degree of association of the arrangement target content so that the minimum degree of association of the corresponding arrangement condition becomes 0 and the minimum degree of association of the arrangement condition directly above the corresponding arrangement condition becomes 1. Then, the arrangement position calculating unit 207 finds a value equal to the normalized value multiplied by the number of the relevant arrangement slots, and decides the arrangement slot to which the content is to be actually allocated among the plural relevant arrangement slots.

That is, when the relevant arrangement slots are orderly arranged according to the content allocation sequence, the arrangement slot whose sequence is the closest to the found value becomes the arrangement slot to which the content should be allocated. When a content has already been allocated to the arrangement slot calculated as the allocation destination, the arrangement position calculating unit 207 confirms whether or not a content has already been allocated to the arrangement slots before and after the calculated arrangement slot. Then, as the actual arrangement destination slot, the arrangement position calculating unit 207 sets a vacant arrangement slot selected in order of proximity to the arrangement slot calculated as the arrangement destination. After deciding the arrangement destination slot, the arrangement position calculating unit 207 registers ID of the allocated content in correspondence to the ID of the decided arrangement slot.

When the degree of association of the arrangement target content is lower than the minimum degree of association of the final arrangement condition among the registered content arrangement conditions, the content is not handled as a target of the list display. Therefore, the arrangement position calculating unit 207 stops the processing of allocating the arrangement slot to the content.

After deciding the arrangement slot of the processing target content, the arrangement position calculating unit 207 inputs ID of the current arrangement target content and the arrangement position of the content display data of the processing target content to the visualizing unit 208 (to be described later) and instructs the visualizing unit 208 to display the content display data.

It should be noted that a method of allocating the content to the arrangement slot is not limited to the above-described method. For example, when the sequence of the degrees of association in the content arrangement conditions is not important, a possible method may be to sequentially check the arrangement destination slots in sequence from the first one to see whether or not a content has already been allocated and allocate contents in sequence to arrangement slots that are vacant (to which a content has not been allocated). It goes without saying that also in this case, a content whose degree of association to the reference content satisfies a certain condition is allocated to the arrangement slot.

The visualizing unit 208 obtains from the HDD 101 the content designated by the arrangement position calculating unit 207 and the corresponding content information. The visualizing unit 208 generates the content display data from the obtained content and content information. The visualizing unit 208 instructs the display control unit 209 to display the generated content display data at the arrangement position input from the arrangement position calculating unit 207.

Figure 9A:
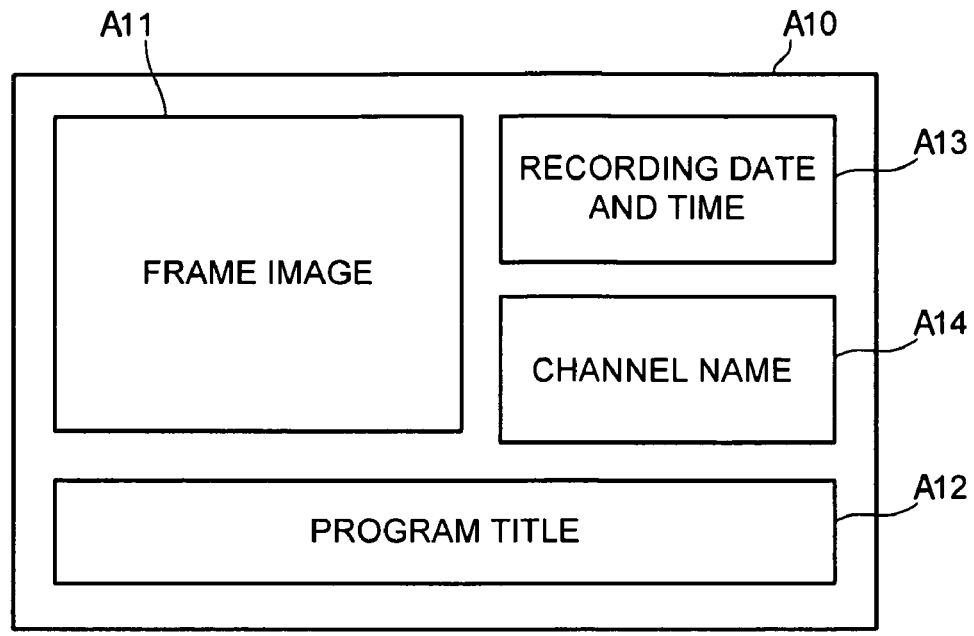
FIG. 9A is a view showing layout.
Figure 9B:
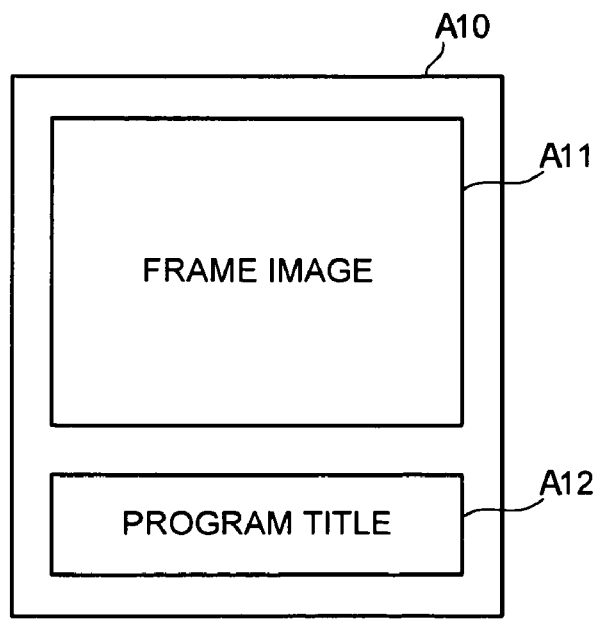
FIG. 9B is a view showing layout.

FIG. 9A and FIG. 9B are views showing examples of the layout of the content display data. By using computer graphic technology, the visualizing unit 208 generates the content display data in which elements characterizing the display target content are laid out as shown in FIG. 9A or FIG. 9B.

The content display data is image data composed of a frame image A11, a program title A12, recording date and time A13, a channel name A14 which are superimposed on a rectangular background A10 (see FIG. 9A). Here, the program title A12, the recording date and time A13, and the channel name A14 are extracted from the content information.

The visualizing unit 208 prepares a plate-shaped polygon whose size matches a display size of the background A10 and texture-maps the frame image A11 on part of (or on all over) a front surface of the polygon so that the frame image A11 is laid out as shown in FIG. A. Here, the frame image A11 may be shown in a form called a thumbnail image. In this case, the visualizing unit 208 reduces or enlarges the frame image A11 according to the display area of the frame image A11.

Further, the visualizing unit 208 generates, as texture images, images of visualized character information such as the program title A12, the recording date and time A13, and the channel name A14. The visualizing unit 208 texture-maps each of the texture images with a predetermined size at a predetermined position on part of the front surface of the polygon. Various methods for visualizing characters have been proposed. For example, this can be realized by using a generally known technique which visualizes (renders) character data expressed by vector data by using Shader Technique in CG technology (see Yoshiyuki Kokojima, et al., Resolution-Independent Rendering of Deformable Vector Objects Using Graphics Hardware, Sketches, SIGGRAPH2006, 2006 and so on).

The frame image A11 is obtained from the content. Further, instead of using the obtained frame image as it is, only a cropped part of the frame may be used. Further, the obtained frame image may be reduced or enlarged to be used with different resolution. A range to be cropped is selected and designated so that an information amount of the frame image with a desired image size becomes largest. This can be realized in such a manner that the frame image is scanned by using a window of the desired image size, entropy in the window is calculated, and a portion of the window is decided as the cropped image so that the entropy becomes largest.

It should be noted that the above-described method is an example and an arbitrary criteria may be used for the cropping. Further, an image with different resolution may be generated by using a retargetting technique. The retargetting is a technique of adaptively converting the resolution so as to express the characteristic of the frame image in the best manner. As the retargetting technique, various techniques have been under research and development. In the present invention, these techniques are appropriately used and the result is utilized as the frame image A11.

Another alternative may be to obtain a frame image at the head of an arbitrary chapter, at an arbitrary frame after the head of the chapter, or the like, by using chapter information obtained from the display target content, and use this frame image as the frame image A11. Further, by using a degree of excitement or the like calculated from the display target content, a frame image of a frame having the highest excitement may be used. An example of a technique usable to calculate the degree of excitement is a generally known technique of calculating the magnitude of a waveform of sound from sound information of the display target content.

Incidentally, in FIG. 9A, the background A10, the frame image A11, the program title A12, the recording date and time A13, the channel name A14 are used, but they are not restrictive. For example, as shown in FIG. 9B, only the frame image A11 and the program title 12 may be superimposed on the background A10. Further, the layout of the content display data is not limited to those shown in FIG. 9A and FIG. 9B.

The above-described method of visualizing characters is an example and other methods may be used. For example, as the background A10, one painted with predetermined color may be used or a predetermined image may be pasted by texture mapping. In this case, based on the category information included in the content information, the color may be changed according to the type of the content, for example, the background A10 is painted blue when the category is sport, and the background A10 is painted yellow when the category is drama. A method of generating the content display data by the visualizing unit 208 is not limited to the above method, and any method to visualize the content as an element of the list display may be used.

The display control unit 209 displays the content display data generated by the visualizing unit 208 at the designated position of the monitor 107. The display control unit 209 holds all the content display data which are current display targets, and when any update of the window or any change in observation point takes place, it generates a changed display window again to send it to the monitor 107 and controls the screen display.

FIG. 10 is a chart showing an example of statistical information. FIG. 11A to FIG. 11P are charts showing calculation processes of the content arrangement conditions. Hereinafter, a method of calculating the content arrangement conditions will be described with reference to FIG. 10 and FIG. 11A to FIG. 11P.

The arrangement condition calculating unit 205 calculates the arrangement conditions according to the procedure described in the following Steps 1, 2. The arrangement condition calculating unit 205 processes the procedure of Steps 1, 2 for each of the contents stored in the HDD 101.

Step 1. The statistical information of the content characteristic information of the content which is a calculation target of the content arrangement condition is calculated.

Step 2. The combination of the content characteristic information is repeatedly changed and the content arrangement conditions are sequentially calculated.

The arrangement condition calculating unit 205 finishes the operations of the above Steps 1, 2 after completing the calculation of the content arrangement conditions necessary for deciding the arrangement slots. Hereinafter, the procedure of the Steps 1, 2 will be described in detail.

(Step 1)

The arrangement condition calculating unit 205 obtains, from the characteristic information holding unit 201, the content characteristic information of the content which is the current calculation target of the content arrangement condition, to calculate the statistical information of the content characteristic information. The statistical information is information indicating how many contents including each value (characteristic information) of the content characteristic information exist in the HDD 101.

As shown in FIG. 10, the statistical information of the content characteristic information includes ID of the corresponding content, value (characteristic information), characteristic element (kind and type), number, and degree of association. The number indicates how many contents having content information including the corresponding characteristic information are stored in the HDD 101. The degree of association is a value when only the corresponding characteristic information matches.

The arrangement condition calculating unit 205 reads out the content characteristic information from the characteristic information holding unit 201. The arrangement condition calculating unit 205 searches for the content information stored in the HDD 101, by using each of the values of the content characteristic information as a search condition. The arrangement condition calculating unit 205 obtains the number of contents satisfying the search condition, that is, having the content characteristic information including the value of the content characteristic information. The arrangement condition calculating unit 205 registers the obtained number in the number column in the statistical information shown in FIG. 10.

The arrangement condition calculating unit 205 sets the content which is the current calculation target of the content arrangement condition, as the reference content, and generates dummy contents each having only each one of the values of the content characteristic information as the content characteristic information. The arrangement condition calculating unit 205 gives to the association degree calculating unit 204 the generated dummy contents as the contents whose degrees of association are to be calculated. The association degree calculating unit 204 calculates the degree of association regarding each of the values of the content characteristic information. The arrangement condition calculating unit 205 obtains the degrees of association calculated by the association degree calculating unit 204 to register them in the column of the degree of association in the statistical information shown in FIG. 10.

The arrangement condition calculating unit 205 calculates the statistical information of the content characteristic information by performing the above-described processing for all the values of the content characteristic information. For example, as a result of calculating the statistical information regarding the content characteristic information shown in FIG. 5, the statistical information shown in FIG. 10 is obtained.

(Step 2)

The arrangement condition calculating unit 205 calculates the content arrangement conditions by using the statistical information held at Step 1. The arrangement condition calculating unit 205 calculates the content arrangement conditions according to the following procedure from Step A to Step G.

Step A. AND of the values in each of the characteristic elements is taken, AND of the results for the respective characteristic elements is taken, and the result is set as the search condition (regarding all the contents, AND of the values of the characteristic elements is taken).

Step B. The search is executed under the search condition generated at Step A and the number of contents satisfying the search condition is obtained and when the number is larger than 0, the search condition and the number are registered in the arrangement condition table (see FIG. 8).

Step C. The number of the search results is subtracted from the number in the statistical information corresponding to each of the characteristic information included in the search condition.

Step D. When the number in the statistical information (see FIG. 10) corresponding to some value of the characteristic information becomes zero, this value of the characteristic information is excluded and the flow returns to Step A.

Step E. AND of the values is changed to OR in order from the characteristic element whose weight at the time of the calculation of the degree of association is low, AND of the characteristic elements is generated as the search condition, Step B and Step C are processed, and the processing is repeated until AND is changed to OR for all the characteristic elements.

Step F. The characteristic element whose weight at the time of the calculation of the degree of association is low is sequentially excluded, AND of the characteristic elements is generated as the search condition, Step B and Step C are processed, and the processing is repeated until all the combinations of the characteristic elements are processed.

Step G. The search conditions each taking OR of the values of each of the characteristic elements are generated so that the minimum degree of association obtained first becomes the highest, and Step B and Step G are processed.

In the above Step A to Step G, the arrangement condition calculating unit 205 successively excludes a content characteristic value whose corresponding number in the statistical information becomes 0, from the elements constituting the search condition. The arrangement condition calculating unit 205 finishes the processing when the numbers corresponding to all the content characteristic values become 0. The arrangement condition calculating unit 205 finishes the processing also when the total number of the contents registered in the arrangement condition table (see FIG. 8) exceeds the total number of the arrangement slots.

The procedure of the above Step A to Step G will be described in detail with reference to FIG. 11A to FIG. 11P. FIG. 11A to FIG. 11P show examples of a case where the content arrangement conditions are calculated by using the content shown in FIG. 5 and FIG. 8 to FIG. 10 and parameters for calculating the degree of association. Note that in the first embodiment, the number of retrieved contents is the number of contents not including the content which is currently the calculation target of the content arrangement condition.

The arrangement condition calculating unit 205 generates the search condition taking AND of the elements of all the characteristic information as shown in FIG. 11A. The arrangement condition calculating unit 205 retrieves from the HDD 101 contents having the content information satisfying the generated search condition to obtain the number of the contents. When AND of the elements of all the characteristic information is taken, the number of the contents obtained under this search condition is the number of contents that are substantially the same as the content which is the calculation target of the arrangement condition.

When the content is moving image data of a TV program, the contents retrieved under the above search condition are a re-broadcast reference content, the same program by a different broadcast wave, and the like. They are contents having the highest degree of association when the content as the calculation target of the arrangement condition becomes the reference content. Therefore, the arrangement condition calculating unit 205 first searches the HDD 101 under the above search condition.

When the number of the retrieved contents is larger than 0 as a result of searching the HDD 101 under the above search condition, the arrangement condition calculating unit 205 registers the search condition and this number in the arrangement condition table. Next, the arrangement condition calculating unit 205 further generates the dummy contents which each have a single value included in the search condition as the content characteristic information and in which the other elements are null. The arrangement condition calculating unit 205 gives the generated dummy contents to the association degree calculating unit 204 and instructs it to calculate the degree of association. The association degree calculating unit 204 calculates the degrees of association of the dummy contents. The arrangement condition calculating unit 205 obtains the degree of association calculated by the association degree calculating unit 204 and registers it as the minimum degree of association under this arrangement condition in the arrangement condition table (see FIG. 11B).

After registering necessary information in the arrangement condition table, the arrangement condition calculating unit 205 subtracts the number of contents retrieved under the current search condition from the numbers of contents, in the statistical information, corresponding to the characteristic information included in the search condition, as described at Step C. The arrangement condition calculating unit 205 determines how many contents corresponding to each of the values of the content characteristic information are included in the HDD 101. This procedure can prevent the search under a useless arrangement condition and overlapping of the contents.

In the example shown in FIG. 11A, the number of contents satisfying the search condition is three. Subtracting 3 from the numbers in the statistical information of all the characteristic information gives 0 for six pieces of the characteristic information. As a result, it is possible to exclude the corresponding characteristic information from the processing thereafter. As described at Step D, when the number for some characteristic information becomes 0 in the statistical information, this characteristic information is excluded from the search condition and the processing is repeated again from Step A. In FIG. 11B, the hatched portions (broken lines) are the characteristic information whose corresponding numbers in the statistical information become 0.

When the number for some characteristic information becomes 0 under the search condition taking AND of all the characteristic information, Step E is processed next. In this processing, the search condition is changed so that OR is taken of the characteristic information of the characteristic element whose influence on the degree of association is smaller, whereby the arrangement conditions are registered in descending order of the minimum degree of association. Concretely, as shown in FIG. 11C, the search condition taking OR of the characteristic information of the keyword characteristic (see FIG. 6) with the smallest weighting factor, taking AND of the other characteristic elements, and further taking AND of the whole is generated.

The arrangement condition calculating unit 205 searches the HDD 101 under the search condition shown in FIG. 11C. The arrangement condition calculating unit 205 obtains the number of contents having the content information satisfying the search condition, and when the contents in number larger than 0 are obtained, the search condition and the number are registered in the arrangement condition table and the minimum degree of association is calculated as previously described (see FIG. 1D).

The minimum degree of association in the case of the OR condition can be calculated by using only the characteristic information with the lowest degree of association among those included in the OR condition. As previously described, the OR condition means that at least one of the elements included therein is included. Therefore, in order to find the minimum degree of association, it is only necessary to use one characteristic information with the lowest degree of association. After the calculated minimum degree of association is registered in the arrangement condition table, the number of the retrieved results is subtracted from the numbers corresponding to the characteristic information in the statistical information.

As the number in the statistical information corresponding to the OR condition, the sum of the numbers calculated for all the values whose OR is taken is used (see FIG. 1D). Similarly, the same processing is repeated for the other characteristic information such as the figure characteristic with the next smallest weight of the degree of association and then the category characteristic. By thus changing the search condition to the OR condition in order from the characteristic element with the small weighting factor, the minimum degree of association corresponding to the whole arrangement condition gradually decreases. Therefore, the arrangement conditions are registered in the arrangement condition table in descending order of the minimum degree of association.

As for the title characteristic, all the numbers become 0 at the stage of the arrangement condition 2 (see FIG. 11C). Therefore, the arrangement condition calculating unit 205 does not use the title characteristic in the calculation of the content arrangement condition thereafter. Further, when OR of the values of each of the other characteristic elements is taken and AND of the results thereof is taken, the number of contents retrieved is 0. The arrangement condition calculating unit 205 does not use the result of OR of the values of each of the other characteristic elements, as the arrangement condition (see FIG. 11E).

After completing the processing for the search condition obtained after the conditions for all the characteristic elements are changed to the OR conditions, the arrangement condition calculating unit 205 similarly processes the combination which is obtained as a result of excluding the characteristic element from the condition in ascending order of the weight of the degree of association (see FIG. 11E to FIG. 11J) as described at Step F. Since the combination obtained as a result of excluding the characteristic element in ascending order of the weight of the degree of association is set as the search condition, the minimum degree of association corresponding to the whole arrangement condition gradually decreases, so that the arrangement conditions are registered in the arrangement condition table in descending order of the minimum degree of association.

FIG. 11E and FIG. 11F show the result when AND of OR of the category characteristic and OR of the figure characteristic is taken. FIG. 11G and FIG. 11H show the result when AND of OR of the category characteristic and OR of the key word characteristic is taken. FIG. 11I and FIG. 11J show the result when AND of OR of the figure characteristic and OR of the keyword characteristic is taken. Note that the hatched portions (solid lines) in FIG. 11A to FIG. 11P show values (characteristic information) of the characteristic elements temporarily excluded and the corresponding portions. Further, the hatched portions (broken lines) show values (characteristic information) of the characteristic elements not used in the processing thereafter (corresponding to the 0 numbers in the statistical information) and the corresponding portions. That is, the values in the hatched portions (solid lines) are used as the search condition again in the processing thereafter but the values in the hatched portions (broken lines) are not used in the processing thereafter.

When there is still a vacant arrangement slot even after the processing is completed for all the combinations and the numbers in all the statistical information of the content characteristic information are not 0, the arrangement condition calculating unit 205 generates the search conditions each taking OR of the remaining values of each single characteristic element so that the minimum degree of association first obtained becomes the highest, and performs the same processing as described at Step G (see FIG. 11K to FIG. 11P).

Incidentally, a special rule may be added to the search condition by using the knowledge about details of the content. For example, in a case of moving image data of a TV program, extensive contents and a large number of contents correspond to the category characteristic. As a result, information of the other characteristics is hidden. In this case, in the process at Step G, by processing the category characteristic last as shown in FIG. 11K to FIG. 11P, the characteristic unique to the contents can be clearly expressed in the arrangement of the contents.

Further, in a case where the type has a hierarchical relation such as main-sub as in the category characteristic, if OR is taken, the result necessarily becomes the higher-order type. Therefore, as shown in FIG. 11O and FIG. 11P, the processing is separated into that under the condition taking AND and that under the condition having only the high-order type. Consequently, the search condition can be generated in more detail.

The total number of the arrangement slots and the number registered in the arrangement condition are compared in such a manner that the total number of the arrangement slots is obtained from the arrangement position calculating unit 207 and the sum of the numbers registered in the arrangement condition is found. As a result of performing the above processing for the conditions each having the single characteristic element, the numbers in all the number columns in the statistical information of the characteristic elements become 0, so that the arrangement condition calculation process is ended. The arrangement condition calculating unit 205 generates the content arrangement conditions shown in FIG. 8 by the above-described processing. By comparing the total number of the arrangement slots and the number registered in the arrangement condition every time the arrangement condition is registered and finishing the processing at a point in time when the number registered in the arrangement condition exceeds the total number of the arrangement slots, it is possible to avoid redundant processing.

In the foregoing, a description is given of the method in which the minimum degree of association and the number of the contents matching the search conditions are used as the content arrangement condition. However, as the content arrangement condition, IDs of actually retrieved contents may be registered in the content arrangement condition instead of the number of contents satisfying the search condition. When the content IDs are used, only by comparing IDs of the contents which are the arrangement targets, it is possible to decide the arrangement positions of the contents.

When the content IDs are used instead of the number as the content arrangement condition, the arrangement condition calculating unit 205, in calculating the content arrangement condition, obtains the number of contents satisfying the search condition and an ID list of the retrieved contents. Further, the arrangement condition calculating unit 205 designates the content which is a calculation target of the content arrangement condition as the reference content and designates contents retrieved by the search as calculation targets of the degree of association and saves the ID list sorted in descending order of values of the degrees of association calculated by the association degree calculating unit 204, as the content arrangement condition.

Thus saving the ID list sorted in descending order of the values of the degrees of association as the content arrangement condition enables the arrangement position calculating unit 207 to decide the arrangement positions of the contents only by sequentially reading out IDs in the ID list from the content arrangement condition and sequentially allocating the contents to the arrangement slots in order of ID in the ID list according to the arrangement order. However, when the ID list is used as the content arrangement condition, if a new content is stored in the HDD 101, the newly added content cannot be displayed on the monitor 107 unless the content arrangement condition is also updated. Even if a content is deleted from the HDD 101, it is possible to detect that the content has been deleted when the arrangement position calculating unit 207 obtains the content information based on the ID list. Therefore, by arranging the contents except the deleted content, it is possible to arrange the contents correctly even if the content arrangement condition has not been updated.

Figure 12:
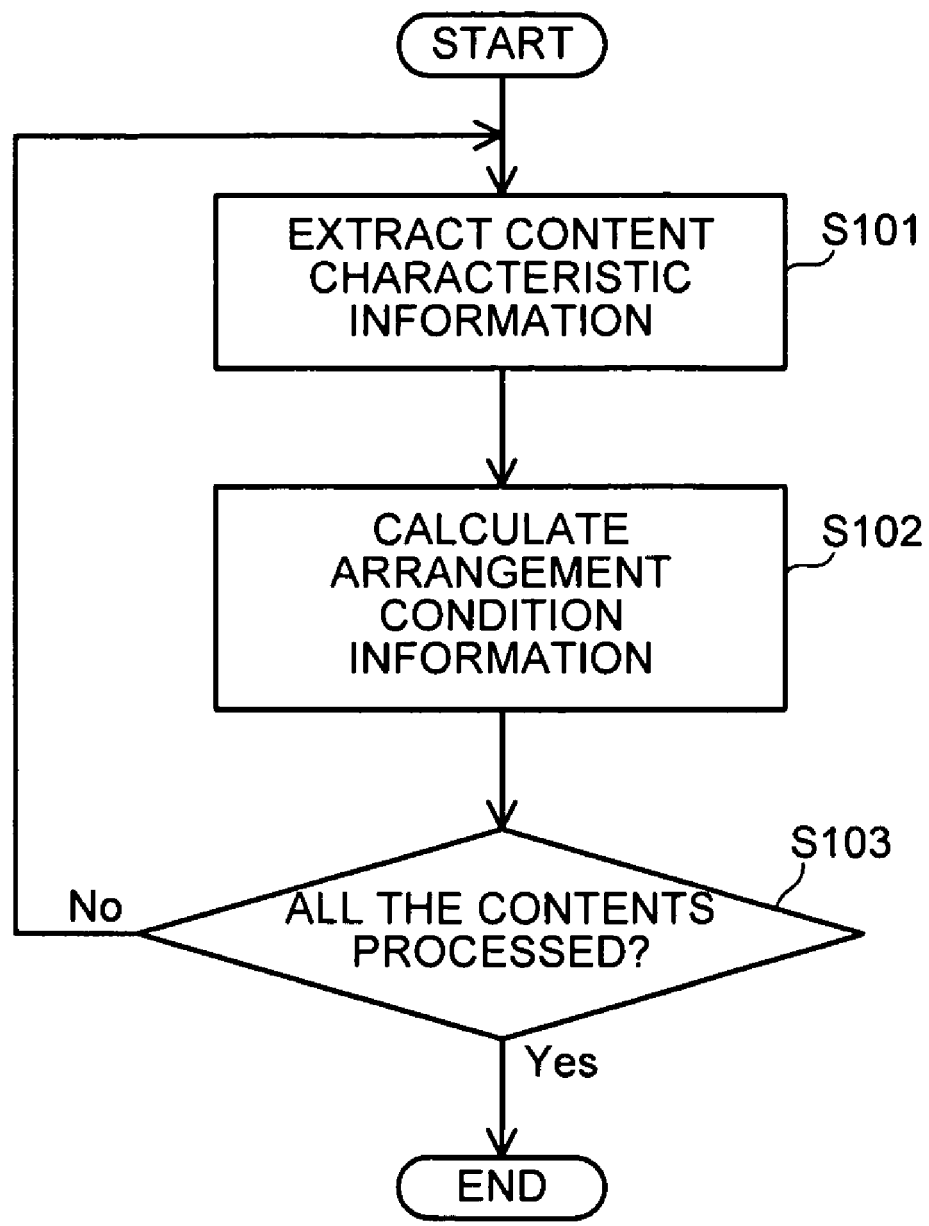
FIG. 12 is a flowchart showing the operation of the data display apparatus according to the first embodiment.
Figure 13:
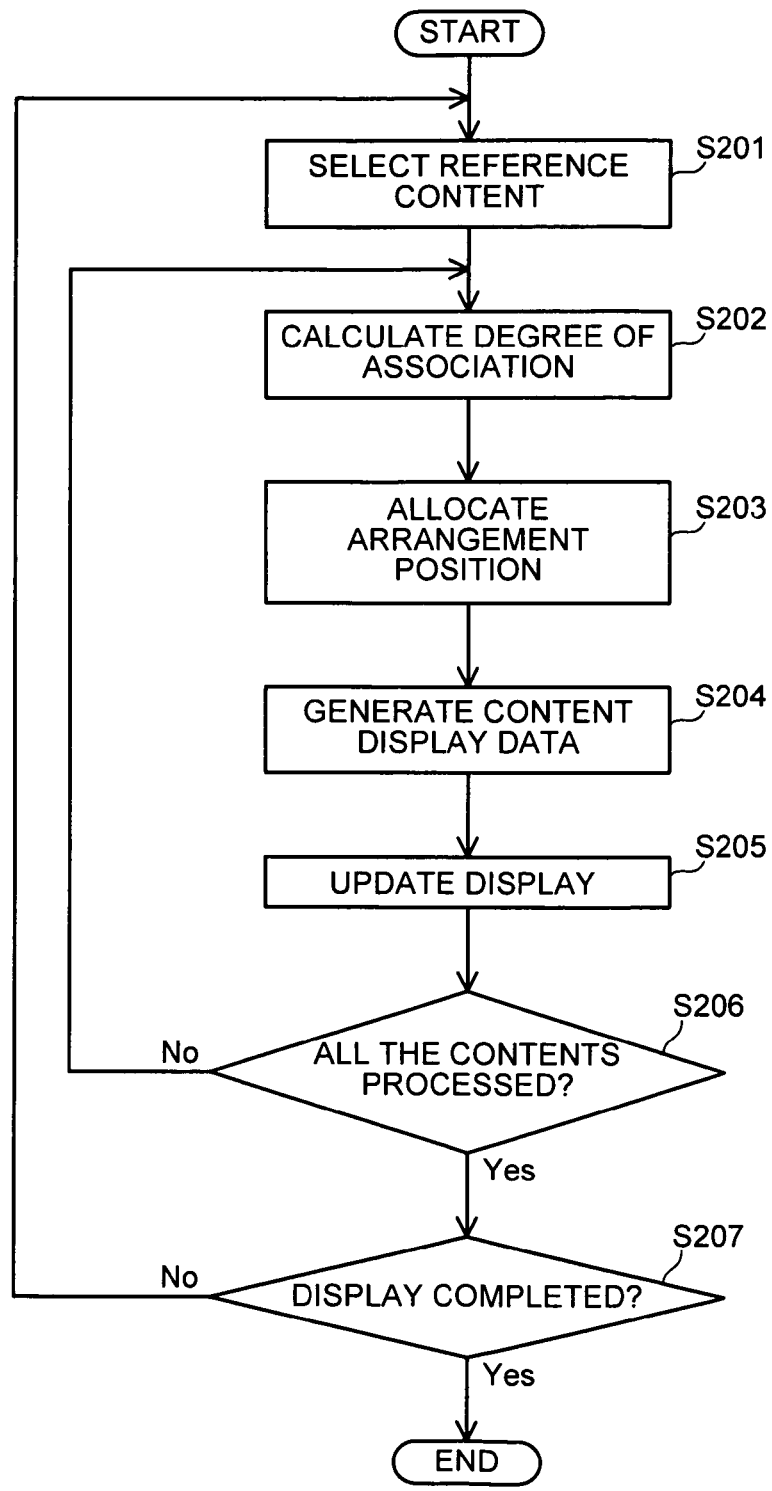
FIG. 13 is a flowchart showing the operation of the data display apparatus according to the first embodiment.

FIG. 12 is a flowchart showing the operation (prior processing) of the data display apparatus 1 at the time of the calculation of the content arrangement conditions. FIG. 13 is a flowchart showing the operation (normal operation) of the data display apparatus 1 at the time of the list display of the contents. Hereinafter, the operation of the data display apparatus 1 will be described with reference to FIG. 12 and FIG. 13.

First, the operation (prior processing) of the data display apparatus 1 at the time of the calculation of the content arrangement conditions will be described with reference to FIG. 12. The characteristic information extracting unit 202 reads out the content information stored in the HDD 101 and extracts the content characteristic information described with reference to FIG. 5 (Step S101). The characteristic information extracting unit 202 stores the extracted content characteristic information in the characteristic information holding unit 201.

The arrangement condition calculating unit 205 reads out the content characteristic information stored in the characteristic information holding unit 201 and calculates the content arrangement condition, assuming that a given content is set as the reference content (Step S102). The arrangement condition calculating unit 205 stores the calculated content arrangement condition in the arrangement condition holding unit 206.

The arrangement condition calculating unit 205 determines whether or not the content arrangement conditions which are generated on assumption that all the contents stored in the HDD 101 are set as the reference content have been calculated (Step S103). When the calculation of the content arrangement conditions for all the contents stored in the HDD 101 has not been completed (No at Step S103), the arrangement condition calculating unit 205 processes Step S101 for a content for which the calculation has not been completed.

When the calculation of the content arrangement conditions for all the contents stored in the HDD 101 has been completed (Yes at Step S103), the arrangement condition calculating unit 205 ends the calculation operation of the content arrangement condition.

The arrangement condition calculating unit 205 periodically confirms the update state of the contents stored in the HDD 101, and calculates the above-described content arrangement condition when a new content has been stored in the HDD 101 and when a content has been deleted from the HDD 101. Note that the arrangement condition calculating unit 205 calculates the content arrangement condition at a predetermined timing not directly involved in the display of the contents (for example, on the background).

Next, the operation (normal operation) of the data display apparatus 1 at the time of the list display of the contents will be described with reference to FIG. 13. The reference content selecting unit 203 selects a new reference content for the list display from the current display state, based on the operation signal from the receiving unit 110 or the user I/F 114 (Step S201). Incidentally, the operation signal selecting the content may be generated by the data display apparatus 1 as described with reference to the reference content selection window (FIG. 4A and FIG. 4B).

The association degree calculating unit 204 calculates the degree of association between the content selected by the reference content selecting unit 203 (reference content) and a target content whose degree of association is to be calculated (hereinafter, referred to as a target content) (Step S202). The association degree calculating unit 204 reads out the content characteristic information stored in the characteristic information holding unit 201 and calculates the degree of association between the reference content and the target content. The association degree calculating unit 204 obtains the content characteristic information of the other contents except the reference content one by one from the characteristic information holding unit 201, and calculates the degrees of association of the respective contents.

The arrangement position calculating unit 207 refers to the degrees of association calculated by the association degree calculating unit 204 and the content arrangement conditions stored in the arrangement condition holding unit 206. Then, the arrangement position calculating unit 207 allocates the processing target content to the arrangement slot (Step S203).

The visualizing unit 208 obtains from the HDD 101 the content designated by the arrangement position calculating unit 207 and the corresponding content information. The visualizing unit 208 generates the content display data from the obtained content and content information (Step S204). After generating the content display data, the visualizing unit 208 instructs the display control unit 209 to display the content display data at the arrangement position input from the arrangement position calculating unit 207.

The display control unit 209 displays the content display data generated by the visualizing unit 108 at the designated position of the monitor 107. The display control unit 209 holds the content display data of all the current display targets. When the updating of the window or a change of an observation point takes place, the display control unit 209 generates again a changed display window and updates the monitor 107 to the changed display window (Step S205).

The list display of the content on the monitor 107 is continued until the operations from Steps S201 to S205 is completed for all the contents except the reference content or until the contents are allocated to all the arrangement slots (Step S206). Here, the arrangement position calculating unit 207 checks the number of the contents having undergone the processes of Steps S201 to S205 and checks vacancy of the arrangement slots. When the list display has not been completed (No at Step S206), the processes from Steps S201 to S205 are repeated for the contents not having undergone the processes.

When the list display of the contents on the monitor 107 is completed (Yes at Step S206), it is determined that the display is ended. When a display end instruction is input from a user, the processing is ended, and when no display end instruction is input and thus the display is continued, an instruction for changing the reference content is waited for, back at Step S201 and the processes thereafter (Steps S202 to S206) are repeated.

As described above, the data display apparatus 1 according to the first embodiment calculates the above-described content arrangement condition and stores the content arrangement condition in the arrangement condition holding unit 206, at a predetermined timing not directly involved in the display of the content (for example, on the background). Therefore, the position where each content is to be arranged can be decided immediately after its degree of association to the reference content is calculated. That is, the decision of the arrangement position of each content need not come after the calculation of the degrees of association of all the contents (except the reference content) stored in the HDD 101 to the reference content. Therefore, even when a large amount of contents are stored in the HDD 101, it is possible to prevent the display delay at the time of a change in the display content due to a change in the reference content. Further, since there is no need to store data of the degrees of association which are calculated for all the combinations of the contents on assumption that each of the contents is set as the reference content, a required data amount can be reduced.

In the foregoing, the structure and operation of the data display apparatus 1 are described, assuming that the contents stored in the HDD 101 are the targets of the list display. However, the targets of the list display may also include contents stored in external memory devices connected to the terminal 112 and contents registered in Web sites on the Internet.

When contents registered in Web sites on the Internet are also set as targets of the list display, there is a possibility that the same content is redundantly registered in a plurality of Web sites. In this case, the same contents would be displayed in plurality on the monitor 107. To prevent such a phenomenon, only contents in Web sites that a user registers as "favorite" may be set as targets of the list display. The confirmation of an update state of the contents registered in the Web sites can be realized by holding an ID list in which URL of the Web site and content identification information (content ID) given to each content in the Web site are stored in a corresponding manner.

Modification Example of First Embodiment

In the first embodiment, the embodiment having a single allocation sequence of the arrangement slots is described. In a modification example of the first embodiment, an embodiment having a plurality of allocation sequences of the arrangement slots (embodiment having a plurality of arrangement slot groups) will be described.

Figure 14:
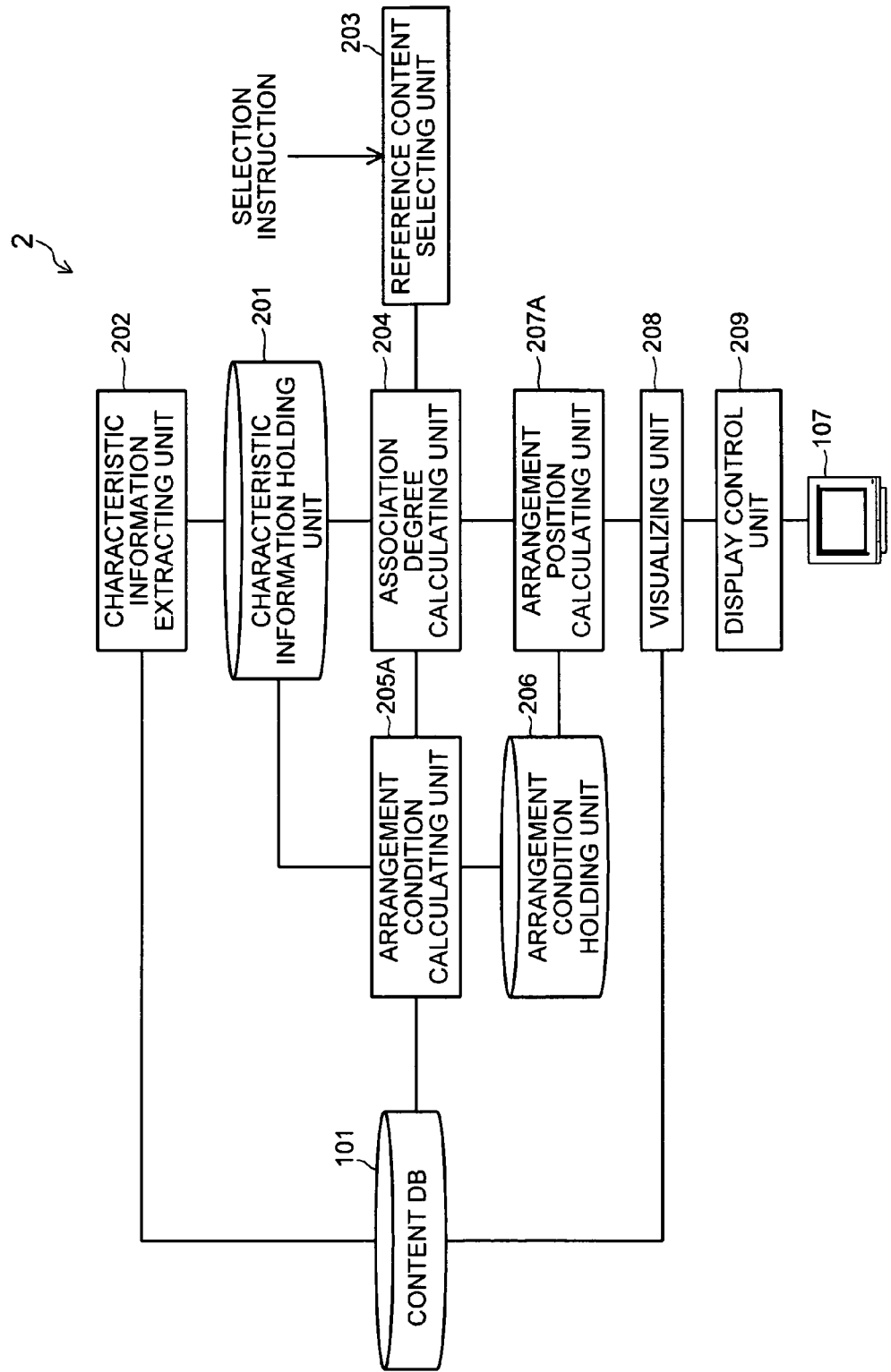
FIG. 14 is a block diagram showing a data display apparatus according to a modification example of the first embodiment.

FIG. 14 is a diagram showing an example of a functional structure of a data display apparatus 2 according to the modification example of the first embodiment. Similarly to the first embodiment, functions of a characteristic information extracting unit 202, a reference content selecting unit 203, an association degree calculating unit 204, an arrangement condition calculating unit 205A (arrangement condition generating unit), an arrangement position calculating unit 207A (arrangement position deciding unit), a visualizing unit 208, and a display control unit 209 are realized by a CPU 108 executing programs stored in a ROM. Further, a memory 109 realizes functions of a characteristic information holding unit 201 and an arrangement condition holding unit 206.

The hardware structure of the data display apparatus 2 according to the modification example of the first embodiment is the same as the structure of the data display apparatus 1 according to the first embodiment described with reference to FIG. 1, and therefore the illustration thereof will be omitted. Further, the same reference numerals and symbols are used to designate the same constituent elements as the constituent elements described with reference to FIG. 1 and FIG. 3, and repeated description thereof will be omitted.

First, the arrangement position calculating unit 207A will be described. The arrangement position calculating unit 207A divides the arrangement slots into the plural groups to manage them. The arrangement position calculating unit 207A assigns an arbitrary attribute to each of the groups and sets the content allocation sequence individually in each of the groups. FIG. 15A to FIG. 15D are charts showing examples of arrangement slot information used by the arrangement position calculating unit 207A. In the modification example of the first embodiment, content characteristic elements (title, category, keyword, figure) are assigned as the attributes.

The title attribute is assigned to an arrangement slot group whose group ID is 1 (see FIG. 15A). The category attribute is assigned to an arrangement slot group whose group ID is 2 (see FIG. 15B). The keyword attribute is assigned to an arrangement slot group whose group ID is 3 (see FIG. 15C). The figure attribute is assigned to an arrangement slot group whose group ID is 4 (see FIG. 15D).

The arrangement slots are divided into the plural groups and contents are allocated to the groups according to the attributes of the contents, which makes it possible to express the association between the contents not only by the overall degree of association but by the kind of association. For example, the use of the arrangement slot information shown in FIG. 15A to FIG. 15D leads to the understanding that contents displayed on a monitor 107 have the association in terms of title in a positive direction of an X axis. It is understood that the contents have the association in terms of category in a positive direction of a Y axis. It is understood that the contents have the association in terms of keyword in a negative direction of the X axis. It is understood that the contents have the association in terms of figure in a negative direction of the Y axis.

Next, the arrangement condition calculating unit 205A will be described. The arrangement condition calculating unit 205A establishes a correspondence relation between arrangement conditions and the arrangement slot groups based on a relation between the attributes assigned to the arrangement slot groups and the arrangement conditions. When the content characteristic elements have been assigned as the attributes of the arrangement slot groups, the arrangement condition calculating unit 205A calculates the degrees of association in terms of the respective characteristic elements in a similar manner for calculating the minimum degree of association for each arrangement condition, and establishes a correspondence relation between the arrangement condition and the arrangement slot group having, as its attribute, the characteristic element in terms of which the arrangement condition has the highest degree of association.

In each of the arrangement slot groups, the arrangement condition calculating unit 205A compares the number of the arrangement slots to which the contents have already been allocated and the number of retrieved contents. The arrangement condition calculating unit 205A calculates the content arrangement conditions which have the information on per arrangement slot group basis. FIG. 16 is a chart showing an example of the content arrangement conditions calculated by the arrangement condition calculating unit 205A.

The operation of the arrangement condition calculating unit 205A will be described with reference to FIG. 16. The arrangement condition 1 has all the content characteristic information. Therefore, the arrangement condition calculating unit 205A establishes a correspondence relation between the arrangement condition 1 and the arrangement slot group 1 having the attribute of the title characteristic which is a characteristic element with the largest weight. As for the arrangement condition 2 and so on, the arrangement condition calculating unit 205A calculates the degrees of association for the respective characteristic elements by the same method as that for calculating the minimum degree of association and compares them, thereby also deciding the arrangement slot groups that are to be registered in correspondence to the respective arrangement conditions.

By thus deciding the arrangement slot groups to be registered in correspondence, the arrangement condition calculating unit 205A calculates the content arrangement conditions shown in FIG. 16. Further, in order to allocate the content to the arrangement slot by using the content arrangement conditions shown in FIG. 16, the arrangement condition calculating unit 205A first calculates its degree of association and finds the corresponding content arrangement condition as in the case where there is only a single arrangement slot group. For example, a content whose degree of association is 0.6 corresponds to the arrangement condition 2, and therefore, can be allocated to one of the arrangement slots whose content allocation sequences are 4 and 5 in the arrangement slot group 1 having the title characteristic attribute, in the same manner as that in the case where only the single arrangement slot group is provided.

Incidentally, in calculating the degree of association regarding the characteristic element, a weighting factor different from the weighting factor used for the calculation of the overall degree of association may be used. By thus calculating the degree of association, it is possible to control the magnitude of the degree of association between the contents and the classification by the arrangement slot group in more detail. Further, the same content may be allocated to different arrangement slot groups. In calculating the degree of association in order to establish a correspondence relation between the arrangement condition and the arrangement slot group, by establishing a correspondence relation with all the arrangement slot groups having, as the attributes, the characteristic elements in terms of which the degrees of association become larger than 0, it is possible to allocate the contents to the arrangement slots even if they have an overlapping portion.

At the time of the content allocation to the arrangement slots, the contents are allocated to the arrangement slots of all the arrangement slot groups registered in the arrangement conditions. By allowing the double allocation, it is possible for the arrangement slot groups to have a role of showing the association between the contents in terms of different aspects. By the processing described above, it is possible to display many target contents as a list based on their degrees of association without delay, also when the arrangement slot groups are provided.

By dividing the arrangement slots into the plural groups and allocating the contents to the groups according to the attributes of the contents as described above, it is possible to express the association between the contents not only by the magnitude of the overall degree of association but also by the kind of the association. That is, it is possible to use a new content representing a common portion of two contents or more, as an index indicating major classification or middle-level classification of the plural contents, which makes it possible for a user to recognize the grouping of the contents (major classification or middle-level classification of the contents).

What is claimed is:

1. A display apparatus, comprising:
a first memory to store a plurality of contents and content information corresponding to the plural contents respectively, the content information including a plurality of elements;
an element selector to select at least one of the plural elements corresponding to first content among the plural contents;
a determining unit to determine whether or not the selected element matches the plural elements corresponding to the contents stored in the first memory except the first content;
a generator to generate corresponding information for each of the contents stored in the first memory based on a result of the determination, the corresponding information showing a correspondence relation between degrees of association to the first content and arrangement positions;
a second memory to store the corresponding information generated by the generator;
a content selector to select second content from the plural contents;
a calculator to calculate degrees of association to the second content by determining whether or not the plural elements corresponding to the second content match the plural elements corresponding to the contents stored in the first memory, except the second content, based on a result of the determination;
a deciding unit to decide, with reference to the second memory, the arrangement positions of the plural contents, except the second content, according to the degrees of association calculated by the calculator; and
a display unit to display the contents at the arrangement positions decided by the deciding unit.

2. The apparatus according to claim 1,
wherein the generator generates information showing a correspondence relation between the degrees of association to the first content and identification information of the contents having the degrees of association.

3. The apparatus according to claim 1,
wherein the generator generates information showing a correspondence relation between the degrees of association to the first content and the number of the contents having the degrees of association.

4. The apparatus according to claim 1, further comprising, an extracting unit to extract a plurality of the elements representing characteristics of the content, from the content information, wherein the element selector selects at least one of the plural extracted elements.

5. The apparatus according to claim 1, wherein the arrangement positions are sorted according to attributes of the contents.

6. A display method, comprising:
from a first memory storing a plurality of contents and of content information corresponding to the plural contents respectively, the content information including a plurality of elements, selecting at least one of the plural elements corresponding to first content;
determining whether or not the selected element matches the plural elements corresponding to the contents stored in the first memory unit except the first content;
generating corresponding information for each of the contents stored in the first memory based on a result of the determination, the corresponding information showing a correspondence relation between degrees of association to the first content and arrangement positions;
storing the generated information in a second memory;
selecting second content from the plural contents;
calculating degrees of association to the second content by determining whether or not the plural elements corresponding to the second content match the plural elements corresponding to the contents stored in the first memory, except the second content, based on a result of the determination;
by referring to the second memory, deciding the arrangement positions of the plural contents, except the second content, according to the calculated degrees of association; and
displaying the contents at the decided arrangement positions.

7. A computer-readable storage medium storing a display program causing a computer comprising a processor to perform operations comprising:
storing in a first memory a plurality of contents and content information corresponding to the plural contents respectively, the content information including a plurality of elements;
selecting at least one of the plural elements corresponding to first content among the plural contents;
determining whether or not the selected element matches the plural elements corresponding to the contents stored in the first memory except the first content;
generating corresponding information for each of the contents stored in the first memory based on a result of the determination, the corresponding information showing a correspondence relation between degrees of association to the first content and arrangement positions;
storing in a second memory the corresponding information generated by the generator;
selecting second content from the plural contents;
calculating degrees of association to the second content by determining whether or not the plural elements corresponding to the second content match the plural elements corresponding to the contents stored in the first memory, except the second content, based on a result of the determination;
deciding, by referring to the second memory, the arrangement positions of the plural contents, except the second content, according to the degrees of association calculated by the calculator; and
displaying the contents at the arrangement positions decided by the deciding unit.

* * * * *